(12) United States Patent
Parravicini et al.

(10) Patent No.: US 11,816,102 B2
(45) Date of Patent: Nov. 14, 2023

(54) NATURAL LANGUAGE QUERY TRANSLATION BASED ON QUERY GRAPHS

(71) Applicant: ORACLE INTERNATIONAL CORPORATION, Redwood Shores, CA (US)

(72) Inventors: Alberto Parravicini, Lesmo (IT); Jinha Kim, Belmont, CA (US); Sungpack Hong, Palo Alto, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 94 days.

(21) Appl. No.: 16/991,888

(22) Filed: Aug. 12, 2020

(65) Prior Publication Data

US 2022/0050840 A1 Feb. 17, 2022

(51) Int. Cl.
*G06F 16/2452* (2019.01)
*G06F 16/22* (2019.01)
*G06F 16/248* (2019.01)
*G06F 16/28* (2019.01)
*G06N 5/025* (2023.01)
*G06N 5/048* (2023.01)

(52) U.S. Cl.
CPC .... *G06F 16/24522* (2019.01); *G06F 16/2246* (2019.01); *G06F 16/248* (2019.01);
(Continued)

(58) Field of Classification Search
None
See application file for complete search history.

(56) References Cited

U.S. PATENT DOCUMENTS

| | | | |
|---|---|---|---|
| 2004/0221235 A1* | 11/2004 | Marchisio | G06F 16/3344 |
| | | | 707/E17.084 |
| 2018/0121500 A1* | 5/2018 | Reschke | G06F 16/243 |

(Continued)

OTHER PUBLICATIONS

Sun, "A Natural Language Interface for Querying Graph Databases", 2017 (Year: 2017).*

(Continued)

*Primary Examiner* — Dawaune A Conyers
(74) *Attorney, Agent, or Firm* — Hickman Becker Bingham Ledesma LLP

(57) ABSTRACT

Techniques described herein allow for accurate translation of natural language (NL) queries to declarative language. A syntactic dependency parsing tree is generated for an NL query, which is used to map tokens in the query to logical data model concepts. Relationship-type mappings are completed based on relationship constraints. Final mappings are identified for any relationship tokens that are associated with multiple candidate mappings by identifying which candidate mappings have the lowest cost metrics. An NL query-specific query graph is generated based on the mapping data for the NL query and the logical data model. The query graph represents an NL query-specific version of the logical data model where grammatical dependencies between NL query words are translated to the query graph. A query graph is annotated with information, from the mapping data, that is not represented paths in the query graph. The query graph is used generate a computer-executable translation of the NL query.

24 Claims, 14 Drawing Sheets

(52) U.S. Cl.
CPC ........... *G06F 16/288* (2019.01); *G06N 5/025* (2013.01); *G06N 5/048* (2013.01)

(56) References Cited

U.S. PATENT DOCUMENTS

| | | | |
|---|---|---|---|
| 2020/0134032 A1* | 4/2020 | Lin | G06F 16/2456 |
| 2021/0056263 A1* | 2/2021 | Xia | G06F 40/40 |
| 2021/0103827 A1* | 4/2021 | Quamar | G06F 16/9024 |
| 2021/0124782 A1* | 4/2021 | Karaca | G06F 16/9024 |

OTHER PUBLICATIONS

Hassan et al., First Workshop on Natural Language Interfaces, Jul. 10, 2020 (Year: 2020).*

Zhong et al., . "Seq2sql: Generating structured queries from natural language using reinforcement learning." arXiv preprint arXiv:1709.00103, dated 2017, 12 pages.

Van Rest, Oskar, et al. "PGQL: a property graph query language." Proceedings of the Fourth International Workshop on Graph Data Management Experiences and Systems. ACM, dated 2016, 6 pages.

Saha, Diptikalyan, et al. "ATHENA: an ontology-driven system for natural language querying over relational data stores." Proceedings of the VLDB Endowment 9.12, dated 2016, pp. 1209-1220.

Buck, Christian, et al. "Ask the right questions: Active question reformulation with reinforcement learning." arXiv preprint arXiv:1705.07830, dated 2018, 15 pages.

Androutsopoulos et al., "Natural language interfaces to databases—an introduction." Natural language engineering 1.1, dated 1995, 50 pages.

* cited by examiner

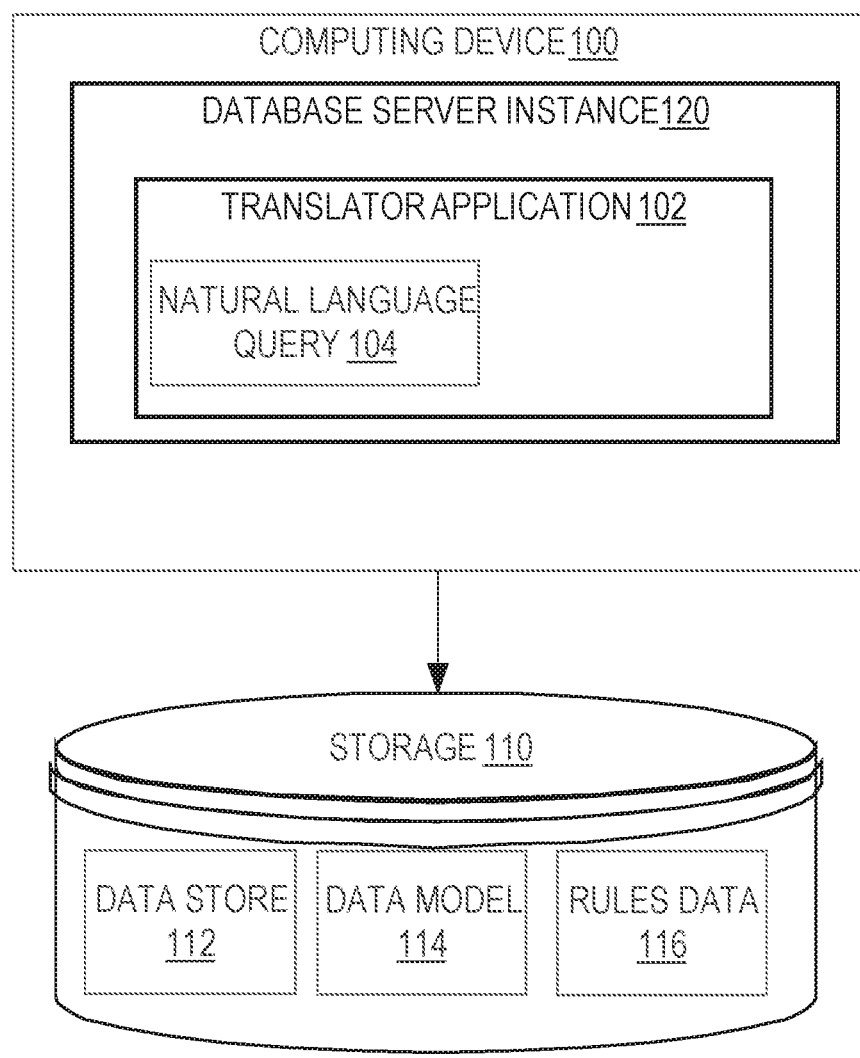

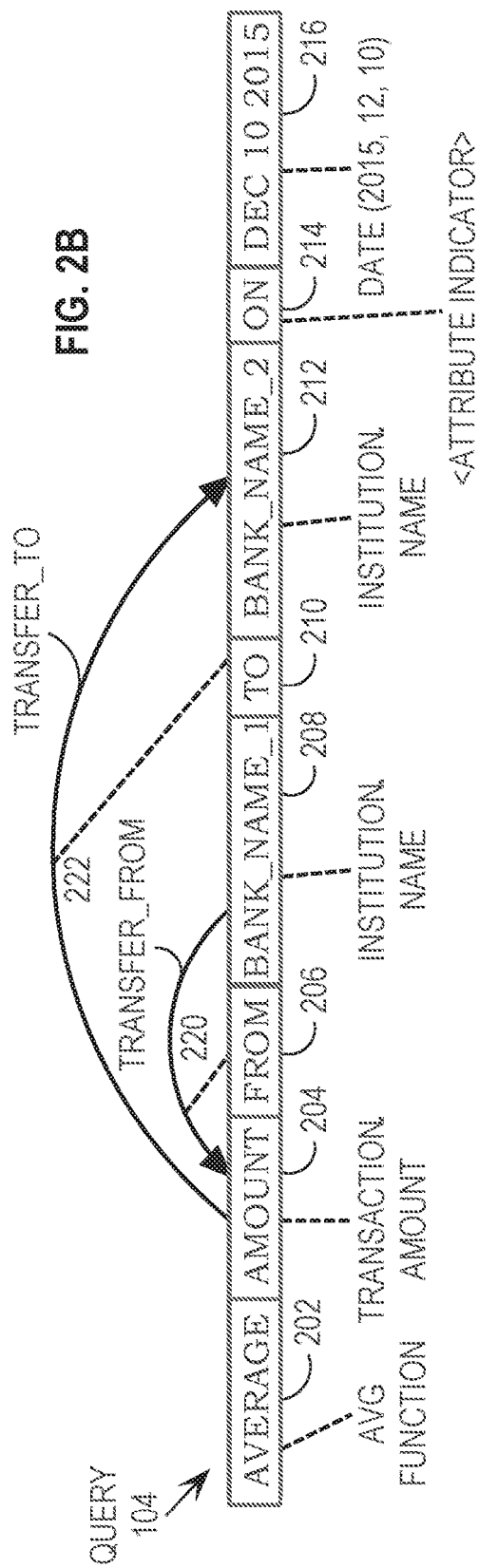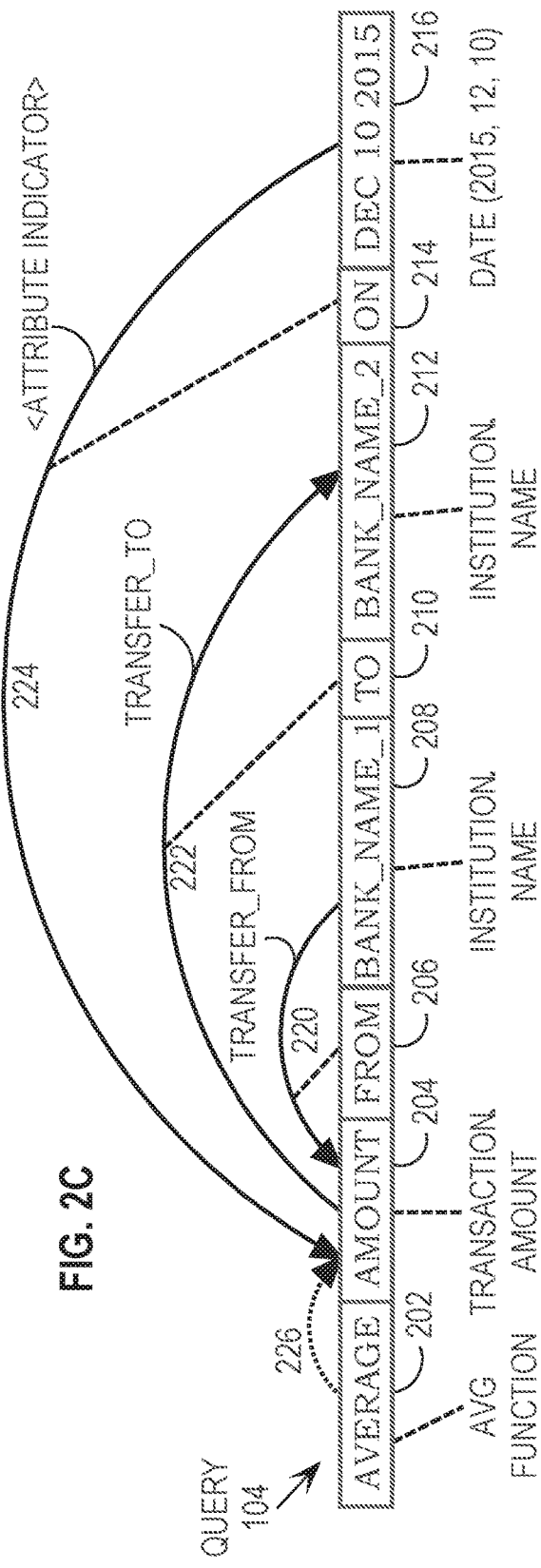

┌─ 402
GENERATE MAPPING DATA THAT MAPS EACH NATURAL LANGUAGE (NL) TOKEN, OF A PLURALITY OF NL TOKENS OF A PARTICULAR NL QUERY OVER ONE OR MORE DATABASE OBJECTS, TO ONE OR MORE DATA MODEL CONCEPTS OF A DATA MODEL ASSOCIATED WITH THE ONE OR MORE DATABASE OBJECTS, WHERE THE MAPPING DATA MAPS A PARTICULAR NL RELATIONSHIP TOKEN, OF THE PLURALITY OF NL TOKENS, TO A PLURALITY OF CANDIDATE RELATIONSHIP MAPPINGS

┌─ 404
IDENTIFY A FINAL RELATIONSHIP MAPPING, OF THE PLURALITY OF CANDIDATE RELATIONSHIP MAPPINGS, FOR THE PARTICULAR NL RELATIONSHIP TOKEN

┌─ 406
FOR EACH CANDIDATE RELATIONSHIP MAPPING, OF THE PLURALITY OF CANDIDATE RELATIONSHIP MAPPINGS, GENERATE A COST METRIC BASED, AT LEAST IN PART, ON THE DATA MODEL AND THE MAPPING DATA TO PRODUCE A PLURALITY OF COST METRICS

┌─ 408
BASED ON THE PLURALITY OF COST METRICS, IDENTIFY THE FINAL RELATIONSHIP MAPPING, FOR THE PARTICULAR NL RELATIONSHIP TOKEN, FROM THE PLURALITY OF CANDIDATE RELATIONSHIP MAPPINGS

┌─ 410
AFTER IDENTIFYING THE FINAL RELATIONSHIP MAPPING, GENERATE A COMPUTER-EXECUTABLE QUERY OVER THE ONE OR MORE DATABASE OBJECTS BASED, AT LEAST IN PART, ON THE MAPPING DATA

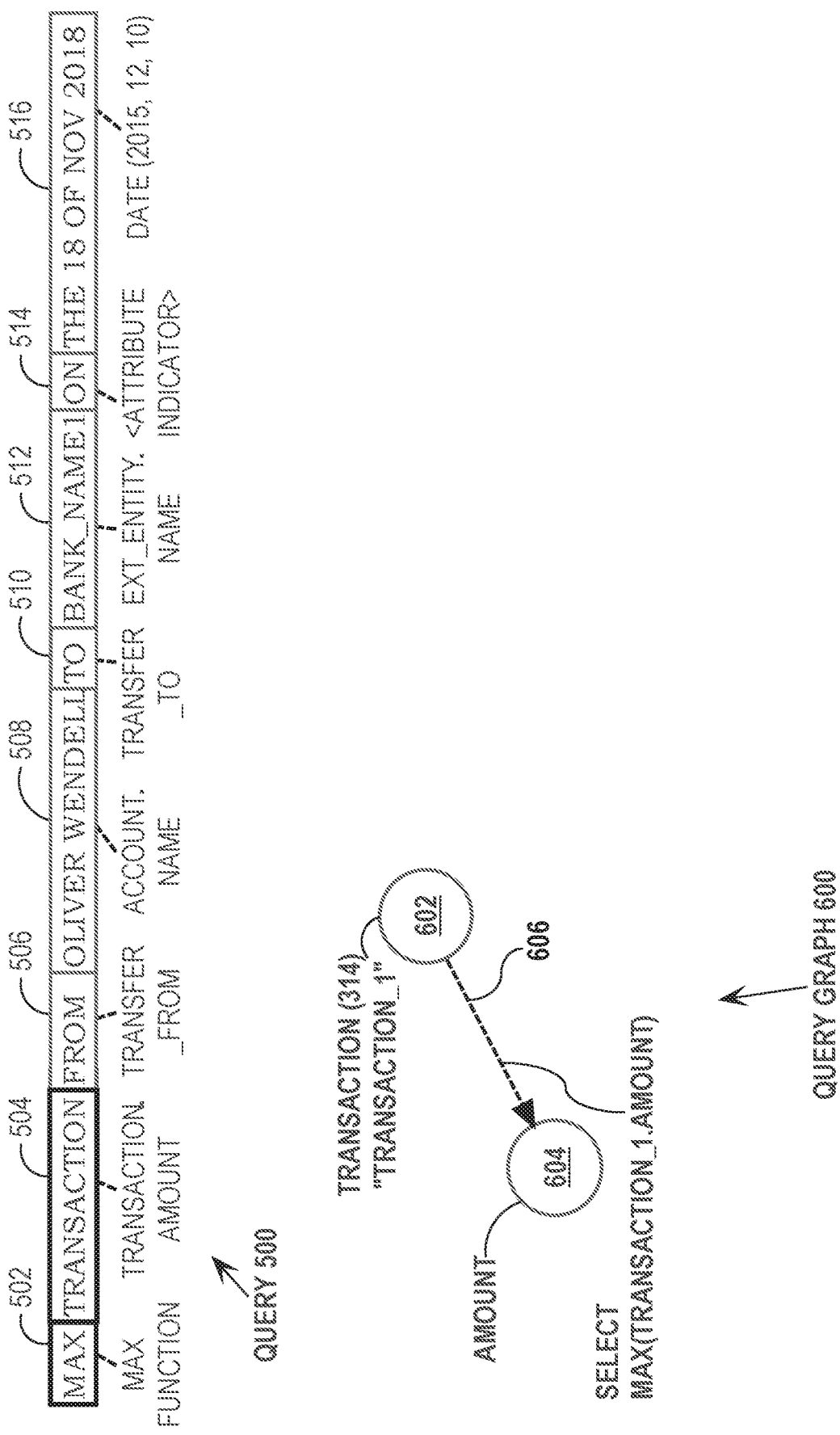

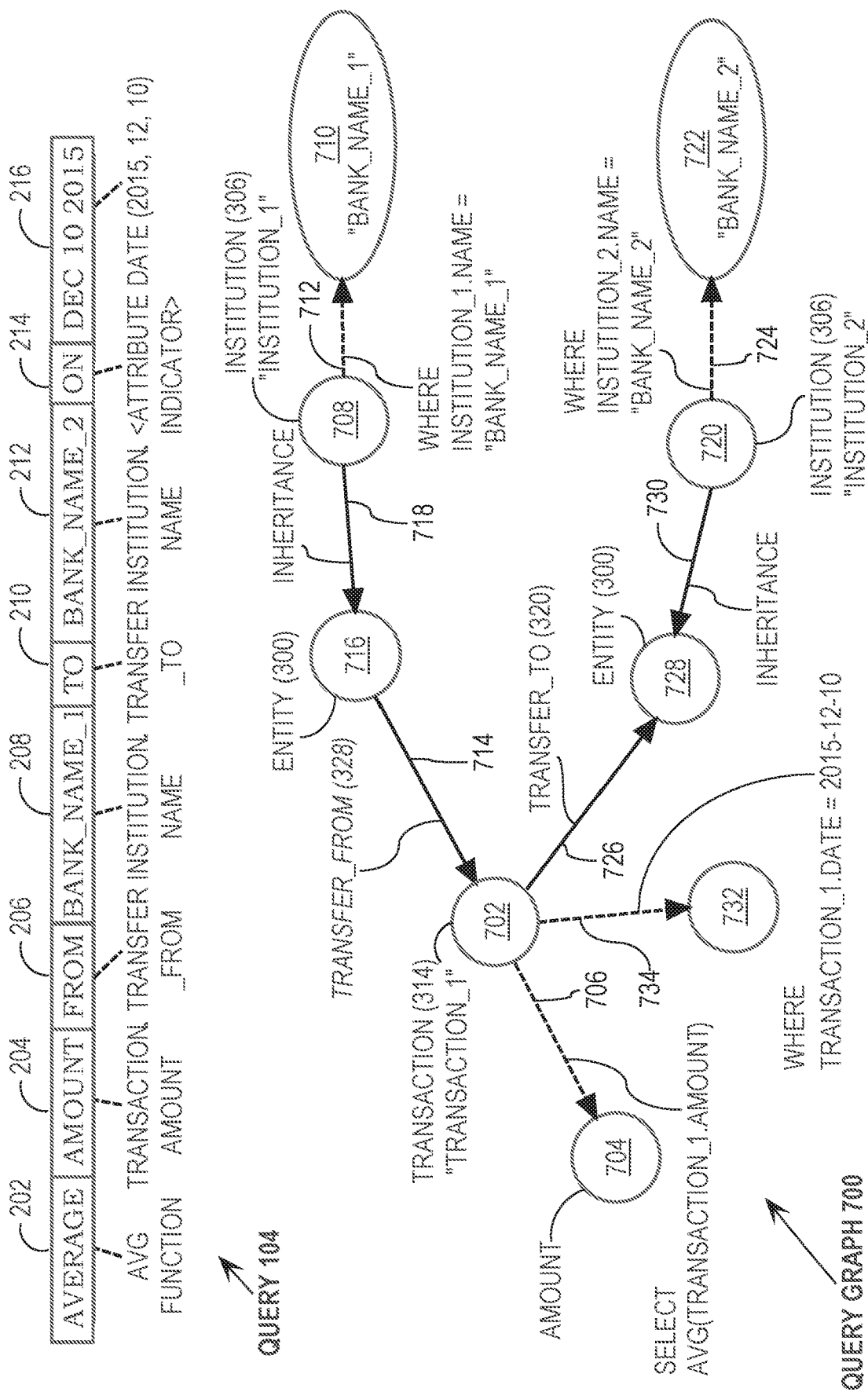

NATURAL LANGUAGE QUERY TRANSLATION BASED ON QUERY GRAPHS

FIELD OF THE INVENTION

The present invention relates to translating a natural language query to a computer-executable query, and, more specifically, to leveraging a logical data model describing target database data to translate a natural language query into a computer-executable query language.

BACKGROUND

Extraction of information from databases of any kind, such as relational databases, non-relational databases, graph databases, etc., is usually performed with declarative query languages such as Structured Query Language (SQL), Property Graph Query Language (PGQL), SPARQL Protocol and RDF Query Language (SPARQL), etc. Declarative query languages express characteristics of desired query results, from a target data store, in a computer-executable format. When a query in a declarative query language is executed by a computing device, the structure of the query is interpreted unambiguously, and the computing device provides results, described by the query, from the targeted data store.

Expressing a query with a declarative language requires knowledge of the language, and also requires knowledge of the physical representation of the targeted data store (i.e., the "physical schema" of the data). Specifically, a data store stores data according to a logical data model that represents logical entities and relationships between entities in the data. A data store also stores data according to a physical schema, which describes the data store-specific implementation of the data model including any data structures present in the data store, functions or methods that may be executed on the different data structures, etc. As a result, end-users without deep technical expertise and understanding of the data store being queried cannot effectively formulate queries using declarative languages.

Many efforts have been made to provide query interfaces to allow non-technical users to extract useful information from database data. Some of these more-accessible interfaces allow queries to be at least partly expressed in natural language (i.e., a language used for human expression such as English, Spanish, French, Chinese, etc.) without reference to the underlying structure of the data, and computer-readable queries are derived from the natural language queries. However, translating natural language queries to declarative query language is not straightforward, as it requires the creation of a mapping between concepts expressed in the natural language query and elements of the target database schema. The process is further complicated by the fact that natural language is inherently ambiguous. Thus, in natural language, similar questions can be expressed in a multitude of ways, and disparate questions may appear relatively similar.

When the target data store is graph data, which is common in the case of social networks or financial transactions, queries are often more complex than queries over relational data, which generally involve matching values in a query to values in the database. While some existing approaches developed for relational databases can be adapted to work with graph databases, the approaches are not able to cope with complex path and reachability queries commonly found in graph databases (such as "find all airports that can be reached in less than 3 stops starting from JFK" or "find all accounts for people named John Smith who are 30 years old"). To illustrate, the natural language query "find all accounts for people named John Smith who are 30 years old" requires matching a name attribute of account-type objects with "John Smith", and an age attribute of person-type objects associated with the name "John Smith" that also have age-type attributes with the value '30'. Also, graph queries may require extracting, or matching, paths from the graph data, which involves mapping semantic or grammatical dependencies between tokens in the input query to relationships in the graph, as with the following query: "find all transactions made by John Smith to other accounts that own a bank account belonging to a United States Bank".

Most research into natural language query interfaces been directed to the development of Natural Language Interfaces to Relational Databases (NLIDB), with little or no attention dedicated to utilizing natural language interfaces for graph databases. One natural language query approach that allows for querying relational data uses an intermediate query representation to decouple translation from natural language to declarative language. Specifically, this approach generates a syntactical dependency tree from a natural language query, and computes an intermediate query representation from the syntactical dependency tree and a logical data model. A computer-executable query is derived from the intermediate query representation using a physical schema for the target data store.

This approach is based on the idea that data in a target data store (whether represented as graph data, relational data, etc.) can generally be described using a logical data model that is structured using entities and relationships between the entities. A logical data model used by this approach abstracts the physical database schema, which might contain implementation details and other technical information not required in the translation from natural language to declarative language.

However, this approach does not translate queries over graph database data. To illustrate, this approach is not able to handle queries that involve cyclical dependencies, such as "find all accounts that sent money to another account", which requires identification of interactions between different entities of the same type. Also, this approach is not able to deal with ambiguous dependencies in a query or with complex path and reachability queries commonly found in graph databases, such as "find all airports that can be reached in less than 3 stops starting from JFK".

Other natural language query approaches leverage deep learning and reinforcement learning to build end-to-end question answering and translation machine-learning models. Even though these techniques show promising results, it is difficult to understand how the translation from natural language to declarative language is performed given that the translation is strongly dependent on complex statistical models. This is a drawback because it is highly desirable to have techniques that provide detailed feedback on how translation was performed (a) for transparency, and (b) in case of failure to translate a query that produces the desired results. Understanding the translation process would allow users to adjust the query according to the system feedback. Because of a lack of feedback, a user must rephrase the failed natural language query based on intuition and hope that the rephrased question will produce different results. Further, like the previously-described approaches, these machine-learning model-based systems also are not able to cope with the complex path and reachability queries, which are possible and highly useful in the context of graph databases.

As such, it would be beneficial to provide a natural language database interface that accurately translates database queries from natural language to declarative language, where the resulting queries that accurately represent complex path and reachability queries, including those with cyclical or ambiguous dependencies. Further, it would be beneficial to provide an approach that could easily furnish an explanation of a translation from natural language to declarative language.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 depicts a block diagram of an example computing device running a translator application that translates natural language queries to declarative language queries.

FIGS. 2A-2C depict tokens, of a natural language query, identified by a translator application.

FIG. 4 depicts a flowchart for identifying a final mapping for a persistently ambiguous relationship token.

FIGS. 6A-6D illustrate producing a query graph that represents a natural language query by translating tokens in the natural language query to paths in a data model.

FIG. 7 depicts a query graph for a natural language query.

DETAILED DESCRIPTION

Figure 2A:
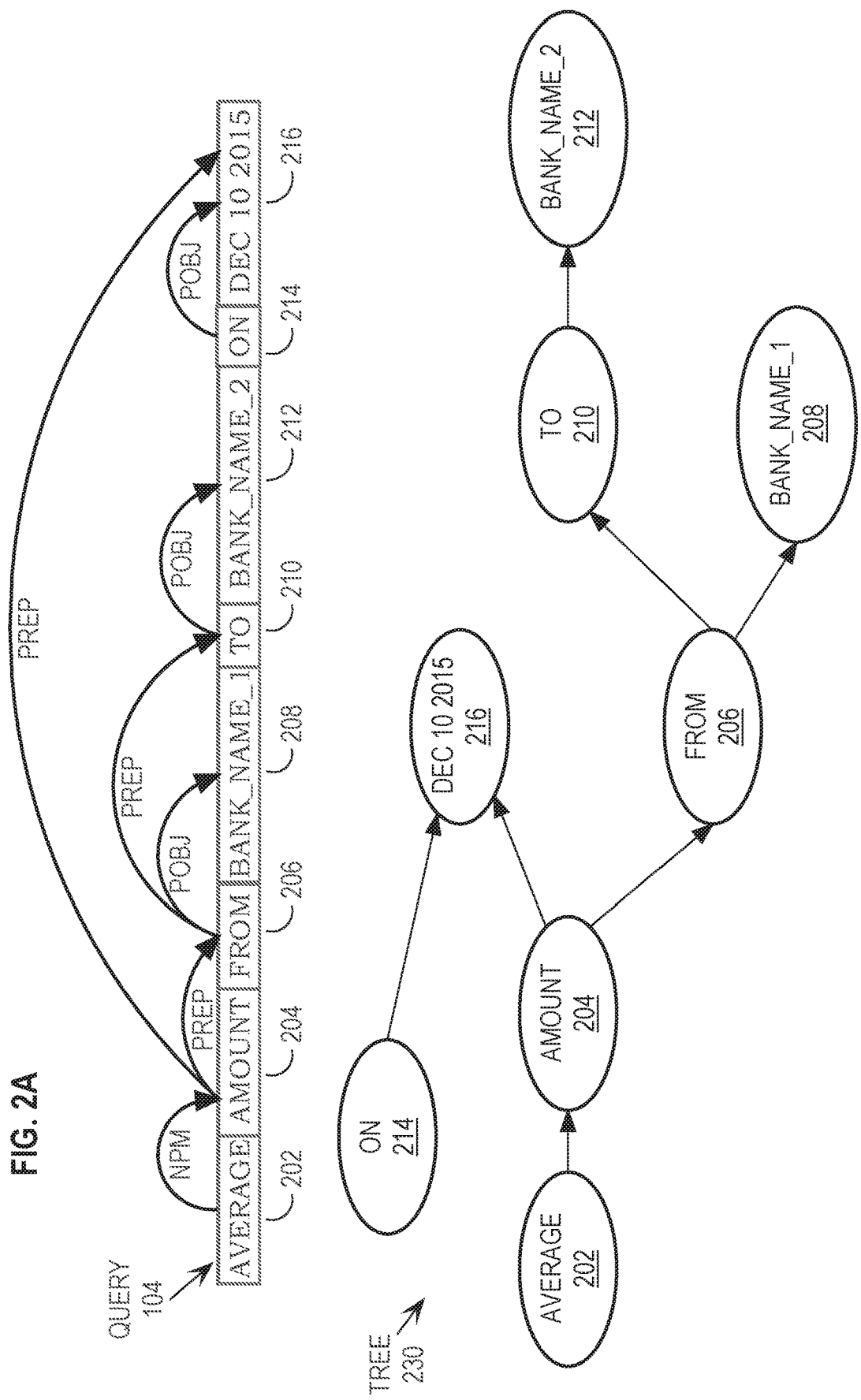

In the following description, for the purposes of explanation, numerous specific details are set forth in order to provide a thorough understanding of the described techniques. It will be apparent, however, that the techniques described herein may be practiced without these specific details. In other instances, well-known structures and devices are shown in block diagram form in order to avoid unnecessarily obscuring the described techniques.

GENERAL OVERVIEW

Techniques described herein allow for more accurate translation of natural language (NL) database queries to declarative language. These techniques may be used to provide a natural language interface to query database data, where users are able to express complex queries using the natural language that they are comfortable with, and with no understanding of the underlying physical structure of the database.

Upon determining to translate a particular NL query over a target data store, natural language processing techniques, such as those implemented by the spaCy natural language parser, are used to tokenize the query and extract information from the natural language of the query. Examples of extracted information include part-of-speech (POS) tags, named entity tags, and a dependency parsing tree, which expresses syntactic relationships between tokens of the query. This information is used to map tokens of the NL query to concepts in a logical data model that represents the logical structure of the target data store. Concepts in the logical data model include (a) entity-type concepts that correspond to types of data stored in the data store (which are represented as vertices in the data model), and (b) relationship-type concepts that correspond to relationships that are possible between the types of data in the data store (which are represented as edges in the data model) and also to relationships between entities and attributes (which are implied edges in the data model).

Some tokens are mapped to entity-type concepts ("entity tokens") and other tokens are mapped to relationship-type concepts ("relationship tokens"). At times, one or more of the tokens are mapped to multiple candidate mappings. Mapping tokens in a query, including named entities, to data model concepts allows expressing a wide range of query conditions (e.g., "WHERE v.name='BankName'") used by declarative languages to specify restrictions on the values that should be retrieved by the query.

According to an embodiment, mapping of NL query tokens to logical data model concepts is based on multiple matching techniques, including direct matching, indirect matching, rules-based matching, and fuzzy matching. Utilization of fuzzy textual similarity allows for more flexible interpretation of NL queries. Furthermore, mapping tokens to data model concepts based on user-supplied rules, which may indicate specific associations between natural language terms and data model concepts, allows users to directly influence NL query translations. For example, after observing a trend in issues with NL query translation regarding mis-translation of "transfer" in NL queries when used as a noun, a subject matter expert provides a matching rule that associates "transfer", when tagged as a noun, with a transaction entity-type concept in the logical data model. After including this rule in a rules data set, when these terms are included in an NL query being translated, the terms are associated with the indicated concept.

A mapping of a relationship token to a relationship-type concept includes metadata in addition to the mapped relationship-type concept that is required to complete the mapping. Specifically, a complete relationship mapping requires identification of a subject and an object of the relationship. Thus, after mapping tokens of an NL query to data model concepts, relationship constraints for each relationship mapping of the NL query are applied to the relationship mappings to identify the metadata required to complete the mapping. Relationship constraints are derived from the mapped data model concept. When a relationship token is associated with multiple candidate mappings, application of relationship constraints of the multiple candidate mappings may reveal that only one of the candidate mappings is viable in that a subject and an object of the viable candidate relationship, which conform to the relationship constraints for the viable candidate mapping, are able to be identified within the NL query tokens.

At times, multiple viable candidate relationship mappings remain for a given relationship token after application of relationship constraints. A relationship token that is associated with multiple viable candidate relationship mappings is referred to herein as "persistently ambiguous". In order to translate the NL query to a computer-executable query, a final mapping for the persistently ambiguous token is identified. According to an embodiment, a final mapping for a persistently ambiguous relationship token is identified by generating cost metrics for each candidate relationship mapping, where the final mapping is associated with the lowest cost metric among the multiple candidate mappings. According to an embodiment, the cost metric for a relationship mapping is determined based on hops, within the logical data model, required to traverse from the subject to the object of the relationship mapping using the edge in the data model that represents the identified relationship-type concept.

According to an embodiment, after resolving any persistently ambiguous token in the NL query, a query graph for the NL query is generated based, at least in part, on mapping data generated for the NL query and the logical data model. According to an embodiment, a generated query graph represents an NL query-specific version of the logical data model where grammatical dependencies between words in the NL query are translated to paths (comprising two or more vertices and one or more edges) of the query graph. A query graph is annotated with query information, from the mapping data, that is not represented by logical data model concepts in the query graph. According to an embodiment, further steps in a natural language-to-declarative query language translation pipeline are based on the generated query graph.

Not only can complex path and reachability queries be correctly translated based on a generated query graph, using a query graph to generate a computer-executable translation of the NL query allows the system to accurately convey the semantics of cyclical references, from the NL query, in the translated query. For example, "average amount from Bank-Name1 to BankName2 on Dec. 10, 2015" is a cyclical NL query in that an "Institution" concept would be mapped to both bank names in the query as both the recipient and source of the referred to amounts. Techniques described herein distinguish between multiple instances of the same concept in a given query by representing the concept instances on different paths of the query graph and/or by using different aliases to distinguish between the multiple concept instances.

The information encoded in the query graph is translated to a valid computer-executable query that can be used to extract information from a target data store. The query graph represents query data in a manner that is not only independent from the final declarative query language, but is also independent from the physical structure of data stored in the target data store. As such, a generated query graph can easily be interpreted in different ways to produce computer-executable queries over many different physical data structures representing the logical data model concepts in different ways. Specifically, a query graph is translated to a computer-executable query by interpreting the query graph based on physical schema translation information that indicates relationships between the logical data model concepts and aspects of a physical schema of the database data.

According to an embodiment, users can inspect mapping data and the query graph generated for a given NL query to extract valuable insights on how the translation from the natural language query to the computer-executable query is performed. For example, a user requests translation of a particular NL query to declarative query language, and a particular persistently ambiguous token in the NL query is resolved to a mapping that was not desired by the user. To address the issue, the user may inspect the mapping data and/or query graph generated for the NL query to determine what caused the undesirable outcome. Based on the mapping data and/or query graph generated for the NL query, the user may modify the initial natural language query so that the NL query language better fits the specified logical model, which is an effective way to resolve ambiguities in the NL query. Having information about the query graph structure provides hints on how the initial query can be modified, instead of having to guess what modification may be effective.

The user may also cause the translator to deal with the NL query differently by adjusting rules data applicable to the NL query, e.g., to include a matching rule that associates a term in the NL query with a desired data model concept or query function, to adjust weights of relationship concepts in the logical data model, etc. To illustrate, according to an embodiment, matching rules (described in further detail below) are handled in different ways depending on whether they refer to propositions/common nouns (e.g., the word "customer"), or to proper nouns (e.g., a name of a specific customer). In the latter case, users can specify mappings between real data values and the logical data element that the real data values refer to (for example, to automatically infer that "Oliver Wendell" is a customer name, and not the name of a bank branch).

Generating and Annotating a Dependency Tree for a Natural Language Query

FIG. 1 depicts a block diagram of an example computing device 100 running a translator application 102 that translates natural language queries to declarative language queries. In the example of FIG. 1, translator application 102 is part of a database server instance 120 of a database management system (DBMS). However, translator application 102 may operate outside of a DBMS, depending on implementation. Computing device 100 receives, from a user, a natural language query 104, which is expressed in a natural language. For example, query 104 is received with a request to run the query over data store 112 stored at persistent storage 110 and managed by database server instance 120. According to an embodiment, data store 112 is a collection of data that may be formatted as graph data, relational data, Resource Description Framework (RDF) data, etc.

Translator application 102 uses natural language processing techniques to parse query 104 to obtain syntactic information for the query. Syntactic information for a query includes tokenization of query words (where each token includes one or more words in the query), and information identifying any named entities (i.e., tokens that represent names of persons, places, organizations, and other proper nouns), part-of-speech tags (i.e., whether a token represents a verb, a noun, an article, a preposition, etc.), and syntactic dependencies between tokens in the sentence (e.g., identification of relationships between tokens, such as subject/verb, adjective/noun). Translator application 102 is configured to parse one or more natural languages, i.e., by implementing one or more language models for the supported natural languages. A language model for a particular language is configured to extract syntactic information for strings that are in the particular language.

To illustrate, query 104 is the following English natural language query: "average amount from Bank_name_1 to Bank_name_2 on Dec. 10, 2015". In response to receiving a request to translate query 104 (i.e., as part of running query 104 over data store 112), translator application 102 parses query 104 using a natural language parser such as spaCy that implements an English language model. FIGS. 2A-2C depict tokens 202-214 of query 104 identified by translator application 102. FIG. 2A also depicts syntactic dependencies between the tokens of query 104 that comprise the syntactic dependency tree 230 for query 104. For example, FIG. 2A depicts the following syntactic edges for syntactical dependency tree 230: a noun phrase adverbial modifier (NPM) edge between tokens 202 and 204; prepositional modifier (PREP) edges between the following pairs of tokens: tokens 204 and 216, tokens 204 and 206, and tokens 206 and 210; and object of preposition (POBJ) edges between the following pairs of tokens: tokens 206 and 208, tokens 210 and 212, and tokens 214 and 216. According to an embodiment, translator application 102 also identifies tokens 208 and 212 as named entities, and applies part-of-speech tags to the various identified tokens, such as noun to tokens 204, 208, and 212, adposition to tokens 206, 210, and 214, and adjective to token 202.

Logical Data Models

According to an embodiment, after identifying syntactic information for query 104, the syntactic information is used to derive mappings between tokens of the natural language query and concepts from a logical data model, such as data model 114 maintained in storage 110, which represents the logical structure of the target data store. Data model 114 represents the logical structure of data store 112, including the kinds of entities that are represented in data store 112 (entity-type concepts), and also the entity attributes and kinds of relationships found between the types of entities in data store 112 (relationship-type concepts).

Figure 3:
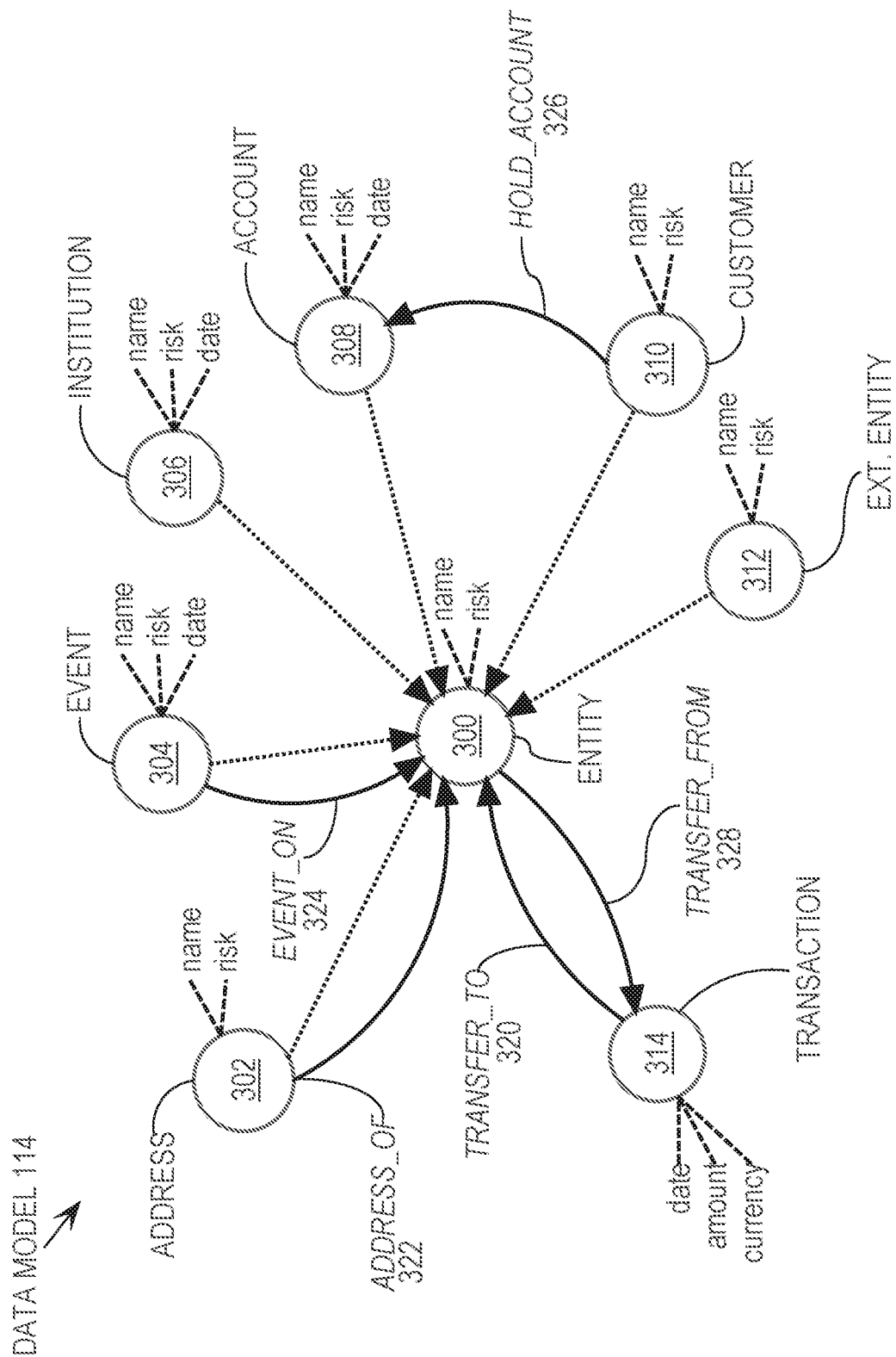
FIG. 3 depicts an example logical data model that reflects the logical concepts represented in a data store.

FIG. 3 depicts example logical data model 114. According to an embodiment, data model 114 does not reflect the physical representation of data store 112, and a physical schema that reflects the physical representation of data store 112 is used to generate a declarative version of the NL query, as described in further detail below. According to another embodiment, data model 114 reflects both the logical concepts of data store 112 and the physical representation of data in data store 112.

Example data model 114 belongs to the financial domain, and expresses monetary transactions between accounts and other entities (such as banks and companies). Examples of NL queries that can be translated using data model 114 include (but are not limited to):

Show the average transaction from John Smith to BankName yesterday.
Find all accounts connected to other accounts located in the US.
Is John Smith connected to United States accounts with risk equal to 9?
Retrieve the investment account with the highest risk connected to John Smith and John Doe.
Compute the maximum wire transfer from BankName, by date.

Natural language queries that are able to be translated based on data model 114 include graph-style queries containing links between different data entities (e.g., "connected to", "max transfer from . . . to . . . "), and also relational-style queries that comprise aggregations and filters (e.g., "maximum transfer", "yesterday").

As shown in FIG. 3, data model 114 indicates that the logical structure of data store 112 includes multiple types of entities, which are represented by the vertices that inherit from entity vertex 300. Specifically, data model 114 includes the following entity-type concepts: an address vertex 302, an event vertex 304, an institution vertex 306, an account vertex 308, a customer vertex 310, and an ext. entity vertex 312. Inheritance (or "is_a") relationships are shown by dotted directional lines.

Data model 114 further indicates the following relationship-type concepts based on explicit edges (note that a relationship according to an edge whose subject/object is entity vertex 300 may have any type of entity, for the subject/object, that inherits from entity vertex 300):

address vertex 302 is the subject of an "address_of" edge 322, where the object of edge 322 is entity vertex 300,
event vertex 304 is the subject of an "event_on" edge 324, where the object of edge 324 is entity vertex 300,
customer vertex 310 is the subject of a "hold_account" edge 326, and account vertex 308 is the object of edge 326,
transaction vertex 314 is the subject of a "transfer_to" edge 320, where the object of edge 320 is entity vertex 300, and
entity vertex 300 is the subject of a "transfer_from" edge 328, where the object of edge 328 is transaction vertex 314.

In addition to the relationship-type concepts shown by explicit edges in the data model, data model 114 further indicates the following relationship-type concepts based on implicit edges between vertices and attributes: a name attribute and a risk attribute for vertices 300-312, a date attribute for vertices 304, 306, 308, and 314, and also an amount attribute and a currency attribute for transaction vertex 314.

Thus, data model 114 reflects the logical structure of data in data store 112 without indicating the physical data structure of data store 112.

Mapping Query Tokens to Data Model Concepts

Based on the syntactic information generated for natural language query 104, tokens in query 104 are mapped to one or more concepts in data model 114 or to one or more functions in a list of query functions (e.g., "AVG", "MAX", "SELECT" etc.). Specifically, translator application 102 generates mapping data that maps each token, of a plurality of tokens of query 104 (which targets one or more database objects, e.g., in data store 112), to one or more data model concepts of logical data model 114 associated with data store 112. For example, FIG. 2B depicts the results of translator application 102 mapping the tokens in query 104 to the following concepts/functions:

token 202 to an average ("AVG") function in a list of query functions;
token 204 to the amount attribute of transaction vertex 314 of data model 114;
token 206 to transfer_from edge 328 of data model 114;
token 208 to the name attribute of institution vertex 306 of data model 114;
token 210 to transfer_to edge 320 of data model 114;
token 212 to the name attribute of institution vertex 306 of data model 114;
token 214 as an attribute indicator (implied edge of data model 114); and
token 216 to a date function in a list of query functions.

Tokens in query 104 that map to relationship-type concepts in data model 114 are referred to herein as "relationship tokens" (such as tokens 206, 210, and 214), tokens in query 104 that map to entity-type concepts in data model 114 are referred to herein as "entity tokens" (such as tokens 204, 208, and 212), and tokens in query 104 that map to query functions are referred to herein as "query function tokens" (such as tokens 202 and 216).

According to an embodiment, translator application 102 identifies one or more mappings for each token in query 104 based on one or more matching techniques, which include: direct matching, indirect matching, rules-based matching, and fuzzy matching. According to an embodiment, for a given token, translator application 102 first attempts (a) direct matching, then (b) rules-based matching, then (c) indirect matching, and finally, fuzzy matching based on (a) then (b) then (c). According to an embodiment, user parameters specify system behavior in case of translator application being unable to identify a mapping for one or more tokens in the NL query being translated, e.g., whether translator application 102 should stop translation of the query, or try to perform a partial translation using the successful mappings, etc.

Direct Matching

Direct matching involves identifying tokens in the natural language query that are also present in the data model. A direct match is a match between a token and either the name of an entity, such as "transaction", "institution", "customer", etc., the name of an entity attribute, such as "name", "amount", etc. For example, token 204 ("amount") of query 104 directly matches the amount attribute of transaction vertex 314. In this case, translator application 102 identifies a mapping between token 204 and the amount attribute of transaction vertex 314.

If a token of the natural language query directly matches an attribute name that is present in multiple types of entities, then multiple candidate mappings are identified between the token and the entity attribute of each of the multiple types of entities. For example, one of the tokens of a natural language query is "name". In this case, the token directly matches the name attribute of each entity that inherits from entity vertex 300 (i.e., address vertex 302, event vertex 304, institution vertex 306, account vertex 308, customer vertex 310, and ext. entity vertex 312). In this example, translator application 102 identifies multiple candidate mappings between the "name" token and each name attribute of the entities that inherit from entity vertex 300.

Rules-Based Matching

Rules-based matching employs matching rules, e.g., in rules data 116 stored at storage 110, to identify matches for natural language query tokens. Using matching rules to map tokens of query 104 with data model 114 concepts increases the quality of the annotations and allows producing accurate results for a wider range of natural language queries.

According to one or more embodiments, matching rules create associations between concepts of data model 114 and words/phrases commonly used to represent the concept in natural language. For example, rules data 116 includes matching rules that make the following associations: "people" and "person" to customer vertex 310, "location" to address vertex 302, "to" to transfer_to edge 320, etc. Matching rules may limit an association based on syntactic information for a given token, e.g., associating the term "transfer", when tagged as a noun, with transaction vertex 314, etc. Using matching rules to identify matches for NL tokens improves translation quality, and, according to an embodiment, can be added to at any time by domain-experts or end-users. For example, rules data 116 is based on a JSON file provided by a user.

According to an embodiment, rules data 116 includes other types of rules. For example, translator application 102 uses rules data 116 to identify a final mapping, from a plurality of candidate mappings, for a given token. To illustrate, a particular rule in rules data 116 indicates that any token in a natural language query that can be matched to a name attribute in data model 114 should be associated with the name attribute of customer vertex 310. For example, translator application 102 receives a request to translate the natural language query "find the name for every account with a balance of over $1 million". Translator application 102 identifies the token "name", and, via direct mapping, maps the token to the name attribute of all entities that inherit from entity vertex 300. Then, based on rules data 116, which indicates that any token in a natural language query that can be matched to a name attribute in data model 114 should be associated with the name attribute of customer vertex 310, translator application 102 identifies a final mapping, from the plurality of candidate mappings, for the "name" token to be the name attribute of customer vertex 310.

Rules data 116 may also be used to map tokens to query functions. For example, rules data 116 associates one or more common terms with query functions of a list of query functions. To illustrate, rules data 116 associates the NL terms "average" and "mean" with the query function "AVG", the "maximum", "highest", and "most" to the query function "MAX", and "find" and "identify" to the query function "SELECT". Based on rules data 116 that associates the NL term "average" with the query function "AVG", translator application 102 maps token 202, of query 104, to the query function "AVG".

According to an embodiment, rules data 116 further includes information to match information such as dates and times to corresponding query functions, respectively, "DATE", "NUMBER", and "TIMESTAMP" in a query function list. According to another embodiment, parsing dates and numbers is done in connection with parsing the NL query using a natural language parser, at which time NL query tokens are annotated with part-of-speech tags and syntactical dependencies.

According to an embodiment, rules data 116 further identifies NL terms that should be mapped as attribute indicators. For example, rules data 116 specifies that "named" is an attribute indicator for the name attribute of entity vertex 300, that the NL terms "amount" and "of" are attribute indicators for the amount attribute of transaction vertex 314, and that "on" is an attribute indicator for the date attributes of institution vertex 306, transaction vertex 314, event vertex 304, and account vertex 308. Based on such rules in rules data 116, translator application 102 maps token 214 ("on") to be an attribute indicator for multiple candidate attribute mappings, i.e., the date attribute of institution vertex 306, the date attribute of transaction vertex 314, the date attribute of event vertex 304, and the date attribute of account vertex 308. Any token that is mapped as an attribute indicator is treated as a relationship token, with a subject that is an attribute value, and an object that is the entity type associated with the attribute indicator in rules data 116.

Indirect Matching

According to an embodiment, indirect matching allows for matches, between tokens of a query and data model concepts, based on database data that is associated with the data model concepts. According to an embodiment, a token is evaluated for an indirect match if it does not directly match a data model concept and/or if it does not match a concept based on rules data 116.

To illustrate indirect matching, data store 112 stores relational data and includes an institution table that has a "company_name" column. The "company_name" column in the institution table is associated with the name attribute of institution vertex 306, e.g., in configuration data accessible by translator application 102 or in rules data 116. Furthermore, the "company_name" column includes information for a particular institution-type entity with the name "Bank_Name_1". Based on this database data, translator application 102 identifies an indirect match between token 208 ("Bank_Name_1") and the name attribute of institution vertex 306. Accordingly, translator application maps token 208 to the name attribute of institution vertex 306.

According to an embodiment, translator application 102 utilizes indexes in data store 112 to facilitate indirect matching. For example, database server instance 120 maintains an index on the "company_name" column of the institution table described above, which is associated with the name attribute of institution vertex 306. When mapping tokens to data model concepts, translator application 102 scans all data sources (such as tables and indexes) that are associated with concepts in data model 114 to determine whether a particular token indirectly matches with a data model concept. For example, data store 112 includes an index on the "company_name" column of the institution table that includes the value "Bank_Name_1", which translator application 102 uses to identify the indirect mapping described above.

Fuzzy Matching

According to an embodiment, fuzzy matching techniques are used to identify matches based on any of the other matching techniques, including direct matching, indirect matching, and rules-based matching. Fuzzy matching employs textual similarity identification techniques to overcome errors in natural language queries. For example, fuzzy matching allows translator application 102 to matching the misspelled NL term "average" to the query function "AVG" by fuzzy matching the misspelled term with "average", which is associated with the query function "AVG" in rules data 116. According to an embodiment, fuzzy matching is employed when a token is failed to be mapped to a data model concept or query function based on the other matching techniques.

Relationship Constraints

Mapping the tokens of query 104 to concepts of data model 114 results in relationship tokens in query 104 being mapped to one or more relationship-type concepts of data model 114. However, the relationship-type concept for a given relationship token is only one element of a complete relationship mapping. Specifically, a complete relationship mapping comprises a unique combination of the following elements: (a) a relationship-type concept mapping, (b) an object token, (c) an object token type, (d) a subject token, and (e) a subject token type. The subject token and object token of a relationship mapping are tokens, within the NL query, that correspond to a subject and an object, respectively, of a relationship represented by the relationship token, as directed by the mapped relationship-type concept.

The information in data model 114 regarding the subject and object of a given relationship-type concept comprises a set of relationship constraints for relationship tokens mapped to the relationship-type concept. For example, as shown by data model 114, the subject of a relationship represented by a token mapped to transfer_to edge 320 in data model 114 should be mapped to transaction vertex 314 (subject constraint of transfer_to edge 320), and the object of the relationship should be mapped to an entity that inherits from entity vertex 300 (object constraint of transfer_to edge 320). An applicable set of relationship constraints for a given relationship mapping informs identification of the other elements of the complete relationship mapping.

Thus, to complete the relationship mappings for the relationship tokens in query 104, translator application 102 applies the relationship constraints associated with the relationship-type concepts mapped to the tokens. To illustrate, translator application 102 has mapped token 206 ("from") to transfer_from edge 328. In data model 114, the subject of transfer_from edge 328 is entity vertex 300 and the object of transfer_from edge 328 is transaction vertex 314. Thus, translator application 102 applies these constraints to identify subject and object tokens for the relationship mapping among the other tokens in query 104.

According to an embodiment, translator application 102 performs the search for tokens that satisfy the relationship constraints for token 206 based on traversing the syntactical dependency tree 230 for query 104, as depicted in FIG. 2A. Syntactical dependency tree 230 reflects the syntactic dependencies shown for tokens 202-216 in FIG. 2A. In tree 230, token 206 has three tokens that are one hop away, i.e., token 204 (parent), token 210 (child), and token 208 (child). Token 204 is mapped to the amount property of a transaction vertex 314, token 210 is mapped to transfer_to edge 320, and token 208 is mapped to the name property of an institution vertex 306. Translator application 102 determines that token 204 satisfies the object constraint for token 206 because it represents a transaction vertex 314. As such, translator application 102 identifies token 204 as the object token (mapped to a single entity-type concept) for the relationship mapping of token 206. Also, token 208 is associated with institution vertex 306, which inherits from entity vertex 300 in data model 114, and thereby satisfies the subject constraint for token 206. Thus, translator application 102 identifies token 208 (is mapped to a single entity-type concept) to be the subject token for the relationship mapping of token 206. The complete mapping for relationship token 206 is illustrated in FIG. 2B by the directed relationship indicator 220 associated with token 206, where indicator 220 begins at token 208 (subject) and ends at token 204 (object).

Translator application 102 applies similar principles to complete the mapping for token 210 ("to"), which has been mapped to transfer_to edge 320, by identifying a subject token and an object token of for the relationship mapping of the token. In data model 114, the subject of transfer_to edge 320 is transaction vertex 314, and the object of edge 320 is entity vertex 300. The tokens in tree 230 that are within a single hop of token 210 are token 206 (mapped to transfer_from edge 328), and token 212 (mapped to the name property of an institution vertex 306). Translator application 102 determines that token 212 satisfies the object constraint for token 210 because it is associated with institution vertex 306, which inherits from entity vertex 300 in data model 114. Thus, translator application 102 identifies token 212 (is mapped to a single entity-type concept) to be the object token for the relationship mapping of token 210.

However, token 206 is mapped to an edge in data model 114 and does not satisfy the subject constraint for the relationship mapping of token 210, i.e., entity-type concept transaction vertex 314. Because no subject token was found for relationship token 210 at distance=1 within tree 230, translator application 102 increases the search distance and inspects tokens that are two hops away (i.e., two parent hops or two child hops, excluding sibling hops) from token 210 within tree 230. The only token in tree 230 that is two hops away from token 210 is token 204 (the parent of token 206). Token 208 is not considered to be two hops from token 210 because it requires a "sibling" hop. Token 204 is associated with a transaction vertex 314, which satisfies the subject constraint of transfer_to edge 320. Accordingly, translator application 102 identifies token 204 as the subject for the relationship mapping of token 210. The complete mapping for relationship token 210 is illustrated in FIG. 2B by the directed relationship indicator 222 associated with token 210, where indicator 222 begins at token 204 (subject) and ends at token 212 (object).

Multiple Candidate Relationship Mappings for a Relationship Token

A relationship token may be mapped to multiple relationship-type concepts within data model 114. Each mapping of a relationship token to one of multiple relationship-type concepts is a candidate relationship mapping for the token. According to an embodiment, translator application applies, for each candidate relationship mapping, the relationship constraints associated with the relationship-type concept of the candidate relationship mapping. At times, application of the relationship constraints for one or more of the candidate relationship mappings reveals that there is no possible subject or object for the one or more candidate relationship mappings, and these non-viable candidate mappings are removed from the relationship token.

To illustrate, data model 114 includes a transfer_account_to edge (not shown in FIG. 3) whose subject is customer vertex 310 and whose object is institution vertex 306. Rules data 116 includes mappings of the word "to" to both transfer_to edge 320 and the transfer_account_to edge described above. Based on rules data 116, translator application 102 maps token 210 ("to") of query 104 to both of transfer_to edge 320 and the transfer_account_to edge, resulting in multiple candidate relationship mappings for token 210. Translator application 102 applies relationship constraints associated with transfer_to edge 320 (i.e., subject is transaction vertex 314 and object is entity vertex 300) and finds a subject token 204 and an object token 212 for the candidate relationship mapping. As such, the candidate transfer_to relationship mapping is viable and remains mapped to token 210.

Translator application 102 also applies relationship constraints associated with the transfer_account_to edge (i.e., subject is customer vertex 310 and object is institution vertex 306), and fails to find any tokens in query 104 that are associated with customer vertex 310. Because translator application 102 could not complete the candidate transfer_account_to relationship mapping, the candidate mapping is non-viable and is removed from being a candidate mapping for token 210. Thus, after application of the relationship constraints for token 210 in this example, token 210 is associated with a single relationship mapping.

Persistently Ambiguous Relationship Tokens

At times, after applying relationship constraints to identify complete relationship mappings for the relationship tokens in an NL query, one or more relationship tokens are associated with multiple viable candidate relationship mappings, which are complete. Such a relationship token is referred to herein as "persistently ambiguous". Specifically, a persistently ambiguous relationship token is associated with a plurality of viable candidate relationship mappings because a plurality of possibilities exists for at least one element of a complete relationship mapping.

To illustrate, token 214 is a relationship token that is mapped as an attribute indicator within data model 114. For an attribute indicator-type data model concept, the subject relationship constraint is attribute value. The object relationship constraint depends on a type of the identified attribute for the attribute indicator. Translator application 102 identifies tokens, in tree 230 that are within one hop of token 214, i.e., token 216. Token 216 is mapped to a date query function and, as such, translator application 102 determines that token 216 represents an attribute value of type date. As such, token 216 satisfies the subject constraint of an attribute indicator, and translator application 102 identifies token 216 to be the subject token for the relationship mapping for token 214.

Based on the type of the identified subject token 216, the object constraint for the relationship mapping of token 214 is one of institution vertex 306, transaction vertex 314, event vertex 304, and account vertex 308 because these vertices are associated with date-type attributes in data model 114. However, there are no other parent or child edges in tree 230 to traverse for token 214. As such, all tokens in query 104, which are associated with any of the types indicated in the object constraint for token 214 are potential subject tokens for the relationship. Translator application 102 determines that query 104 includes the following candidate objects for the relationship mapping of token 214: tokens 212 and 208, which are associated with institution vertex 306, and token 204, which is associated with a transaction vertex 314. Because there is no additional information based on which a final mapping may be selected for token 214, translator application 102 associates token 214 with multiple complete candidate relationship mappings, where each candidate relationship mapping identifies a respective object token of tokens 204, 208, and 212. Based on being mapped to multiple viable candidate relationship mappings, token 214 is persistently ambiguous, i.e., because of the multiple subject-object combinations that are possible for the relationship represented by the token.

Furthermore, a token may be persistently ambiguous because of multiple subject-object combinations based on the identified subject or object token having multiple candidate mappings. For example, data store 112 includes a record of an institution named "Wells Fargo", and also includes a record of a person named "Wells Fargo". While data store 112 includes this data, translator application 102 receives a request to translate a natural language query that includes the term "Wells Fargo". Translator application 102 uses indirect matching to map the term to both a name attribute of a customer vertex 310 and a name attribute of an institution vertex 306. Translator application 102 also maps a relationship token in the query to event_on edge 324. Translator application 102 applies the relationship constraints for event_on edge 324 (subject is event vertex 304 and object is entity vertex 300) and identifies the token ("Wells Fargo") as the object for the relationship mapping. Because the object of event_on edge 324 is entity vertex 300, from which both institution vertex 306 and customer vertex 310 inherit, the relationship token is associated with multiple candidate relationship mappings, a first candidate relationship mapping that indicates that the "Wells Fargo" token is mapped to customer vertex 310, and a second candidate relationship mapping that indicates that the "Wells Fargo" token is mapped to institution vertex 306. Thus, the relationship token is persistently ambiguous.

Furthermore, a relationship mapping may be rendered persistently ambiguous by the presence of multiple valid paths through data model 114. For example, in data model 114, the customer vertex 310 is linked directly to entity vertex 300 through the inheritance relationship ("Customer->[is a]->Entity"). However, the path "Customer->[hold account]->Account->[is a]->Entity" is also valid in data model 114.

Identifying a Final Mapping for a Persistently Ambiguous Relationship Mapping In order to translate an NL query into declarative language, final relationship mappings are identified for persistently ambiguous relationship tokens, i.e., from among the candidate relationship mappings associated with the tokens. FIG. 4 depicts a flowchart 400 for identifying a final mapping for a persistently ambiguous relationship token.

Specifically, at step 402 of flowchart 400, mapping data is generated, where the mapping data maps each natural language (NL) token, of a plurality of NL tokens of a particular NL query over one or more database objects, to one or more data model concepts of a data model associated with the one or more database objects, where the mapping data maps a particular NL relationship token, of the plurality of NL tokens, to a plurality of candidate relationship mappings. According to an embodiment, the data model comprises: entity-type concepts that are represented by a plurality of nodes in the data model, and relationship-type concepts that are represented by (a) a plurality of edges between nodes of the plurality of nodes, and (b) a plurality of implied edges that represent relationships between nodes and node attributes.

For example, as described in detail above, after generating a syntactic information for query 104, translator application 102 maps tokens of query 104 to entity-type and relationship-type concepts of data model 114. As also described in detail above, after application of relationship constraints to relationship tokens, at least one relationship token, e.g., token 214, is mapped to a plurality of candidate relationship mappings. As indicated above, after application of relationship constraints, token 214 is associated with multiple candidate attribute indicator-type relationship mappings that all identify subject token 216 and that respectively identify object tokens 204, 208, and 212.

At step 404 of flowchart 400, a final relationship mapping, of the plurality of candidate relationship mappings, for the particular NL relationship token is identified. For example, upon determining that token 214 is persistently ambiguous, translator application 102 performs data model path evaluations for the multiple candidate relationship mappings associated with token 214. According to an embodiment, step 404 comprises steps 406 and 408.

At step 406 of flowchart 400, for each candidate relationship mapping, of the plurality of candidate relationship mappings, a cost metric is generated based, at least in part, on the data model and the mapping data to produce a plurality of cost metrics. For example, translator application 102 generates a cost metric for each candidate relationship mapping for each persistently-ambiguous relationship token in query 104, i.e., for the candidate relationship mappings for relationship token 214.

According to an embodiment, the cost metric for a given candidate relationship mapping is determined based on the length of a corresponding path in data model 114. To illustrate, the path through data model 114 that corresponds to subject token 216 (date attribute) and object token 204 requires one hop across the implied edge between transaction vertex 314 and the date attribute of transaction vertex 314. Thus, the cost of this candidate relationship mapping is '1'. Similarly, the path through data model 114 that corresponds to subject token 216 (date attribute) and object tokens 208/212 also requires one hop across the implied edge between institution vertex 306 and the date attribute of institution vertex 306. Thus, the cost of both of these candidate relationship mappings is also '1'. According to this reckoning, the cost of all of the candidate relationship mappings are the same, '1', which is not useful for selecting between the candidate mappings.

According to an embodiment, edges and implied edges in data model 114 may be weighted to affect the resulting cost metrics. In this case, weighted edges can aid translator application 102 to select the most appropriate candidate mapping. To illustrate using the above example, it is far more likely that a user will submit a query on the date of a transaction or an event than it is that a user would submit a query on the founding date of an institution. Thus, the administrator assigns a weight of '3' to the implied edge between the date attribute and institution vertex 306. Using the weighted edge cost, the cost of the candidate relationship mappings involving institution vertices (i.e., tokens 208 and 212) is '3', and the cost of the candidate relationship mapping that identifies the object to be token 204 associated with transaction vertex 314 is '1'.

At step 408 of flowchart 400, based on the plurality of cost metrics, the final relationship mapping, for the particular NL relationship token, is identified from the plurality of candidate relationship mappings. For example, based on the cost metrics determined from the weighted edges, described above, translator application 102 identifies a final relationship mapping for token 214 to be attribute indicator-type concept with subject token 216 and object token 204. The final relationship mapping for token 214, selected in this manner, is illustrated in FIG. 2C by the directed relationship indicator 224 associated with token 214, where indicator 224 begins at token 216 (subject) and ends at token 204 (object).

As a further example, a particular relationship involves a path between customer vertex 310 and entity vertex 300. As described above, there are two valid paths through data model 114 between these two vertices—one via the inheritance path directly between customer vertex 310 and entity vertex 300 (cost is '1' because it involves a single hop), and one that traverses hold_account edge 326 to account vertex 308 and then the inheritance edge between account vertex 308 and entity vertex 300 (cost is '2' because it involves two hops). In this case, the path with a cost of '1' is the preferred match, as the cost metric is smaller. However, it is noted that if the NL query requires the query graph to contain the relationship "hold_account" (e.g. "find accounts held by Oliver Wendell"), then the second path option may have the lower cost metric for that query.

As yet another example, for an NL query that includes the language "transactions from Oliver Wendell", translator application 102 maps "transactions" to transaction vertex 314, "from" to transfer_from edge 328, and also generates multiple candidate mappings for the token "Oliver Wendell", i.e., to the name attribute of account vertex 308 and to the name attribute of a customer vertex 310. Because of the multiple candidate mappings for "Oliver Wendell", there are multiple candidate complete relationship mappings for the token "from". The first relationship mapping comprises "account-[is_a]->entity-[transfer_from]->transaction", and in the second relationship mapping comprises "customer-[hold_account]->account-[is_a]->entity-[transfer_from]->transaction". Both are valid paths, but the first has a cost metric of '2' and the second has a cost metric of '3'. Thus, the first complete relationship mapping is selected to be the final mapping for the "from" token, and, based on the selected complete relationship mapping, the "Oliver Wendell" token is assigned a final mapping to the name attribute of account vertex 308.

Identifying a Target for Query Functions

Generally, an NL query includes one or more query function tokens that are mapped to one or more respective query functions. According to an embodiment, translator application 102 identifies one or more target tokens for any query function tokens in the NL query based on function constraints, e.g., in rules data 116. A query function constraint, applicable to a given query function, may indicate a type for the target token of a query function, e.g., a string type, an attribute with a particular label such as "name", a number type (which may include any number of more specific data types, such as integer, float, currency), particular syntactic tags, etc. Function constraints for a given query function may include constraints on the distance of the target token from the query function token within the syntactic dependency tree of the NL query, such as the target token should be a direct child of the query function token, or the target token should be within a distance=2 of the target token.

To illustrate, query function token 202 of query 104 is mapped to the query function "AVG". To identify the target token for the mapped query function, translator application 102 applies function constraints that are applicable to the AVG query function. In this example, rules data 116 includes a function constraint for AVG that requires the target token to represent a number, which may include any number of more specific data types, such as integer, float, currency, etc. Translator application 102 traverses dependency tree 230 from token 202 and identifies token 204 one hop from token 202. Translator application 102 determines that token 204, mapped to the amount attribute of transaction vertex 314 (where data model 114 includes a type for the attribute of "currency"), is a number. As such, translator application 102 identifies token 204 to be the target token for query function token 202, as shown by indicator 226 of FIG. 2C.

Construct the Query Graph

At step 410 of flowchart 400, after identifying the final relationship mapping, a computer-executable query over the one or more database objects is generated based, at least in part, on the mapping data. According to an embodiment, translator application 102 bases generation of a declarative (computer-executable) query, from an NL query, at least in part on a logical query graph that is constructed based on concept mappings for the NL query described in detail above. A query graph of an NL query is a specialized instance of data model 114 that represents paths through concepts of data model 114 that are mapped to the NL query. As described in further detail below, a graph query of an NL query is used to construct an intermediate representation of the NL query, based on which a declarative translation of the NL query is generated.

Figure 5A:
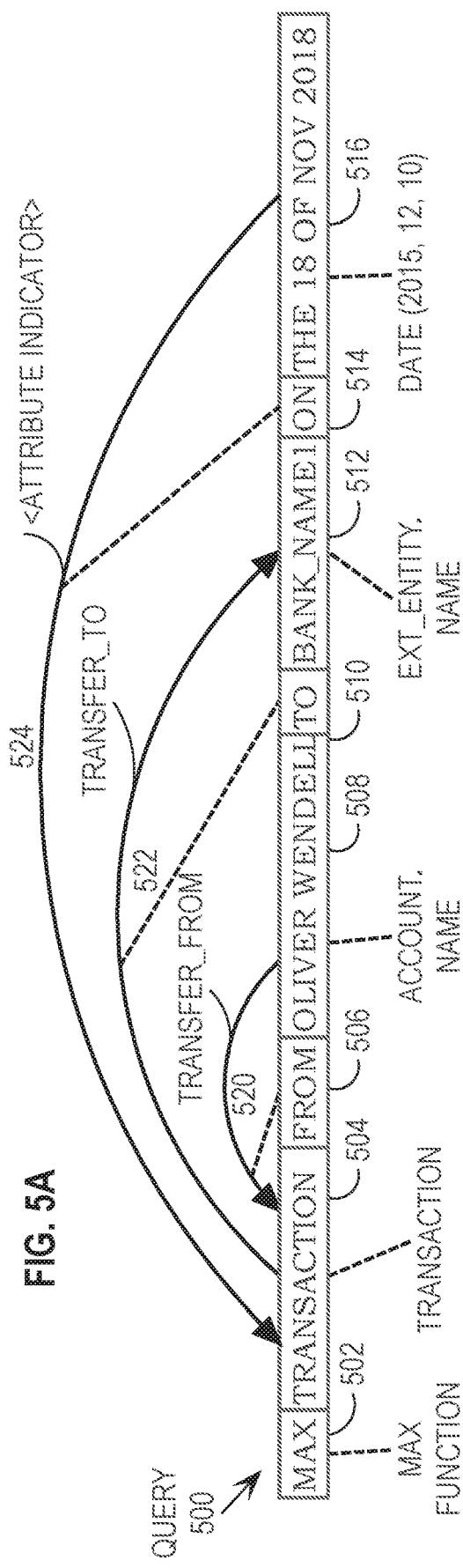
FIGS. 5A-5B depict tokens, of a natural language query, identified by a translator application, as well as mapping data that maps tokens to data model concepts.

To illustrate translator application 102 receives a request to translate an NL query 500 depicted in FIG. 5A, "max transaction from Oliver Wendell to Bank_Name1 on the 18 Nov. 2018", into a declarative query. As described above, upon receiving a request to translate query 500, translator application 102 derives syntactic information from the NL query and uses the syntactic information to map tokens of query 500 to concepts of data model 114. Specifically, translator application 102 tokenizes query 500 into tokens 502-516. Tokens 502-516 are mapped to concepts of data model 114 as follows:

token 502 to a maximum ("MAX") function in a list of query functions;
token 504 to transaction vertex 314 of data model 114;
token 506 to transfer_from edge 328 of data model 114;
token 508 to the name attribute of account vertex 308 of data model 114;
token 510 to transfer_to edge 320 of data model 114;
token 512 to the name attribute of ext. entity vertex 312 of data model 114;
token 514 as an attribute indicator (implied edge of data model 114); and
token 516 to a date function in a list of query functions.

According to an embodiment, translator application 102 maps token 508 ("Oliver Wendell") to a concept of data model 114 based on indirect matching described above. As an example, translator application 102 determines that "Oliver Wendell" is in data store 112 as the name of a customer (customer vertex 310) and as a name associated with an account (account vertex 308). Thus, in mapping data, translator application 102 maps token 508 to both customer vertex 310 and account vertex 308. Translator application 102 resolves the multiple candidate mappings using cost metrics as described above, and selects the name attribute of account vertex 308 as the final mapping for token 508.

In a manner similar to query 104 described above, translator application 102 applies relationship constraints for the relationship tokens (506, 510, and 514) of query 500. Accordingly, translator application 102 identifies a complete relationship mapping 520 for token 506 including subject token 508 and object token 504, a complete relationship mapping 522 for token 510 including subject token 504 and object token 512, and a complete relationship mapping 524 for token 514 including subject token 516 and object token 504.

Translator application 102 also applies function constraints for the "MAX" function associated with query function token 502 that indicate that the MAX function operates over a number that is after the function token within distance=2. Based on the syntactic dependency tree for query 500, translator application 102 determines that the three candidate target tokens are token 504, token 506, and token 516. Because token 506 is a relationship token and token 516 is a query function token, these tokens are removed from target candidacy.

Figure 5B:
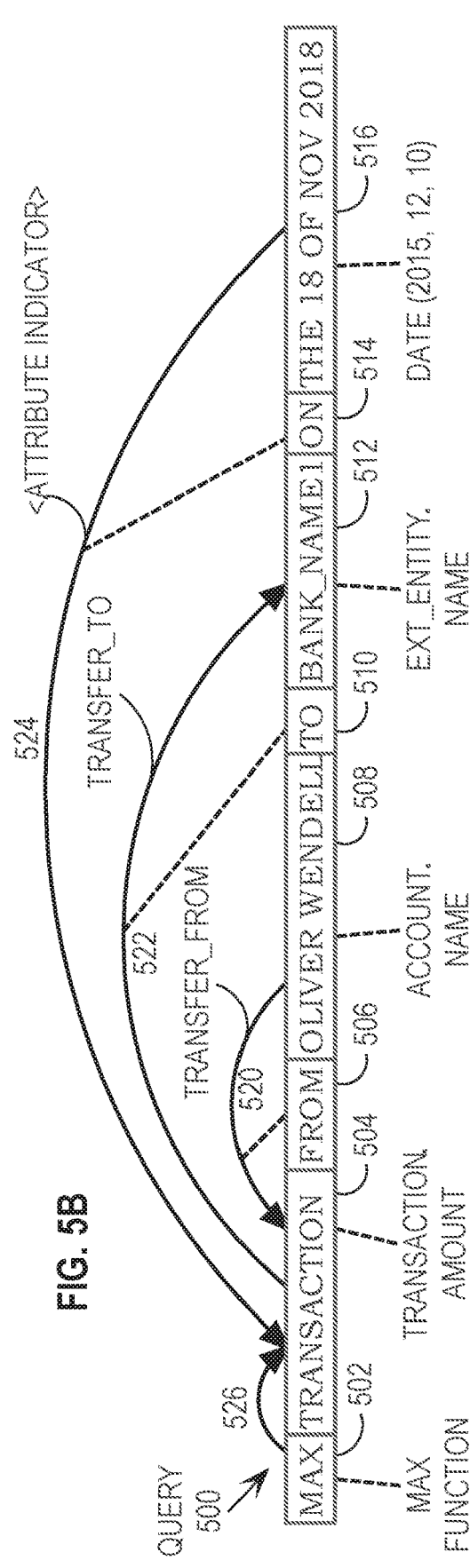

Because token 504 is mapped to an entity-type concept (transaction vertex 314), and not to a number, translator application 102 automatically scans the attributes of transaction vertex 314 to determine if any are of a number type. In this case, "amount" is the only attribute of transaction vertex 314 that is a number type. Thus, translator application 102 identifies token 504 to be the target token for query function token 502, as shown by indicator 526 of FIG. 5B. According to an embodiment, as shown in FIG. 5B, translator application 102 adjusts the mapping data for query 500 to map token 504 to the amount attribute of transaction vertex 314 based on determining that the target of the query function for token 502 is the amount attribute.

If there were multiple attributes associated with transaction vertex 314 that are of a number type, translator application 102 identifies a final target attribute for the query function based on cost metrics (as described in detail above). Cost metric-based analysis allows an administrator to direct application of functions to particular attributes based on weighting the implied attribute edges.

Translator application 102 generates a query graph based, at least in part, on the mapping data and the logical data model. More specifically, translator application generates a query graph 600, depicted in FIGS. 6A-6D, based on mapping data generated for query 500 and data model 114. Query graph 600 is a query-specific subset of data model 114 in which concepts of data model 114 are used to represent the syntactic dependencies and query information indicated in NL query 500. FIGS. 6A-6D respectively illustrate different sets of tokens from query 500 and their associated paths, from data model 114, reflected in query graph 600. The order in which FIGS. 6A-6D represent concepts of query graph 600 is not necessarily indicative of the order in which translator application 102 identifies the concepts for query graph 600, but is an illustration of the concepts included in the depicted query graph.

In connection with creating query graph 600, translator application 102 assigns an alias to each entity token 502-516. If multiple tokens that refer to the same data model vertex appear in the same path of a query graph, the multiple tokens are assigned different aliases (e.g., <person_a>friend_of<person_b>). According to an embodiment, if multiple tokens that refer to the same data model vertex appear in different paths of a query graph, the tokens have the same alias, unless both tokens have a WHERE filter applied to them. Specifically, the system assumes that tokens that refer to generic entities (such as "a customer") refer to the same generic entity unless additional information is provided. For example, in the NL query "transactions from Bank1 to Bank2", "Bank1" and "Bank2" are identified as two different named entities, and are assigned different aliases, e.g., <bank_1> and <bank_2>. The translated query will include WHERE filters of the form "WHERE<bank_1>.name="Bank1" and "WHERE <bank_2>.name="Bank2".

FIG. 6A depicts the following graph concepts, in query graph 600, which correspond to token 504 (mapped to the amount attribute of transaction vertex 314) of query 500: a graph vertex 602 corresponding to transaction vertex 314 and associated with the alias "transaction_1"; a graph vertex 604 corresponding to the amount attribute of transaction vertex 314; and a graph edge 606 that corresponds to the implied edge in data model 114 between the amount attribute and transaction vertex 314. Based on token 502, mapped to the MAX query function targeting token 504, translator application 102 annotates edge 606 with the metadata "SELECT MAX(transaction_1.amount)", which is pseudocode that indicates that the amount attribute of a transaction, alias "transaction_1", is the target of the MAX function represented by token 502. SELECT is a keyword required by some declarative languages to specify the output of the query. According to an embodiment, it is understood that query 500 is intended to retrieve the MAX (transaction_1.amount), and the SELECT keyword is automatically added to obtain a syntactically valid query.

Figure 6B:
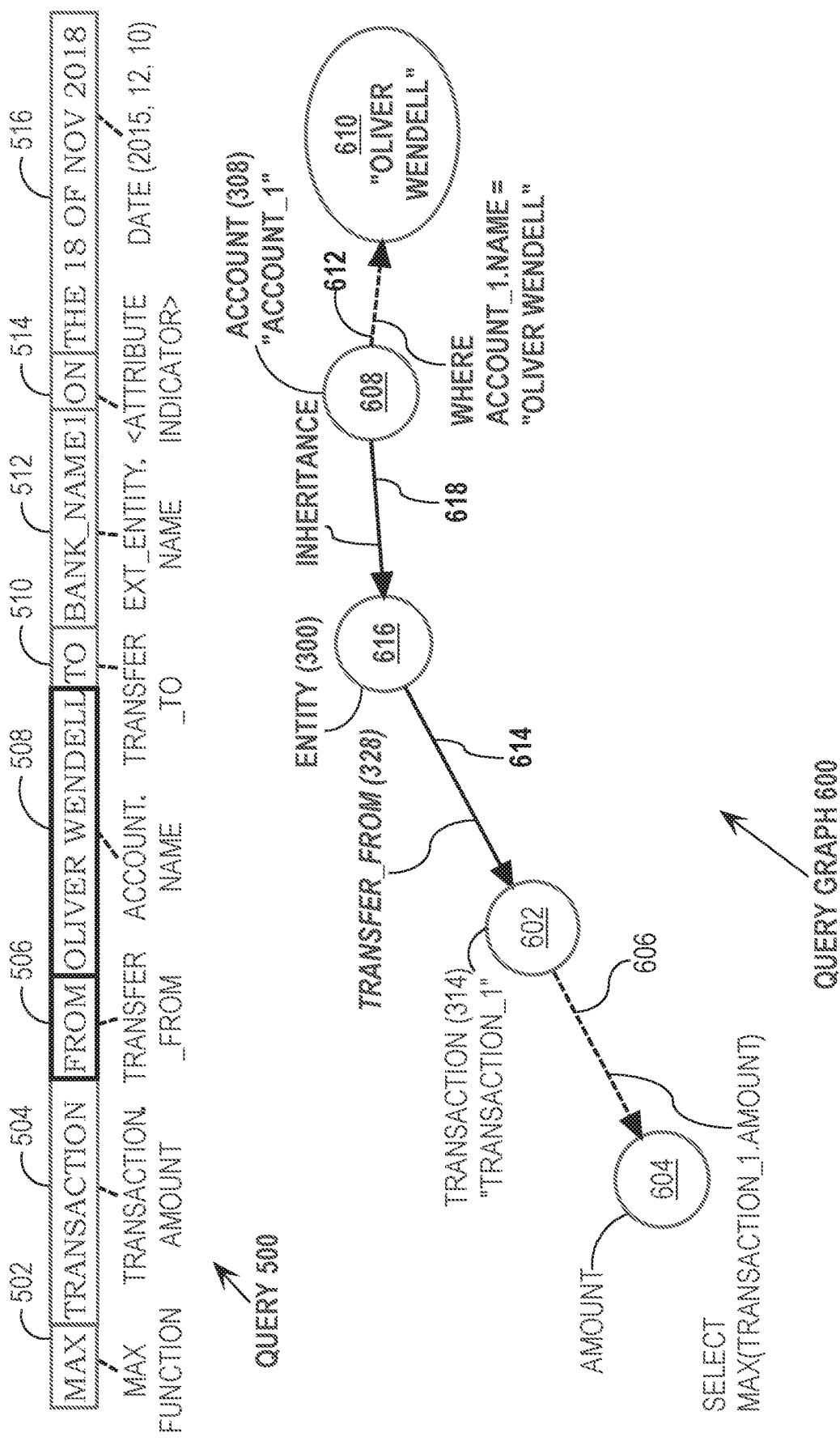

FIG. 6B depicts the following graph concepts, in query graph 600, which correspond to token 508 (mapped to the name attribute of account vertex 308) of query 500: a graph vertex 608 corresponding to account vertex 308 and associated with the alias "account_1"; a graph vertex 610 corresponding to the name attribute of account vertex 308, which is annotated with metadata indicating the name string of token 508; and a graph edge 612 that corresponds to the implied edge in data model 114 between the name attribute and account vertex 308. In addition to, or instead of, the annotation of vertex 610 to indicate the required string for the name attribute of account vertex 308, translator application 102 annotates edge 612 with the metadata "WHERE account_1.name="Oliver Wendell", which is pseudocode that indicates that the name attribute of an account, alias "account_1", should be the name string represented in token 508.

FIG. 6B further depicts an edge 614 in query graph 600 that corresponds to transfer_from edge 328, which is mapped to relationship token 506. According to the complete relationship mapping for token 506, the subject of the relationship is token 508 (represented by graph vertex 608) and the object of the relationship is token 504 (represented by graph vertex 602/604). However, in order to traverse the path in data model 114 from account vertex 308 to transaction vertex 314 by way of transfer_from edge 328, entity vertex 300 must be traversed by way of the inheritance ("is_a") relationship between account vertex 308 and entity vertex 300. Thus, query graph 600 includes a graph vertex 616 corresponding to entity vertex 300, and an inheritance graph edge 618 that represents the inheritance relationship between account vertex 308 and entity vertex 300. The subject of edge 614 (transfer_from) is graph vertex 608 (account) by way of graph vertex 616 (entity), and the object of edge 614 (transfer_from) is graph vertex 602 (transaction), as directed by the mapping data for query 500.

Figure 6C:
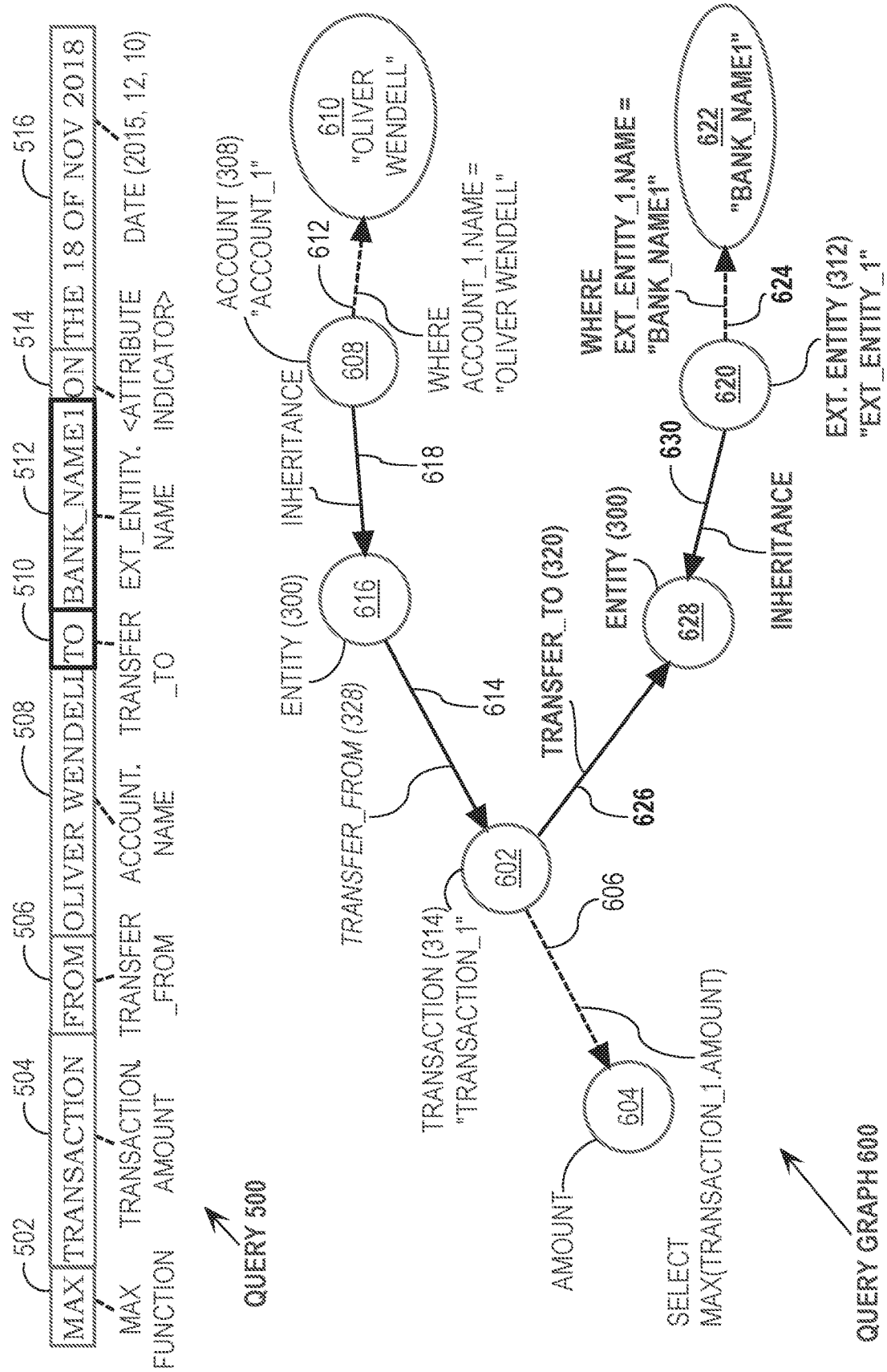

FIG. 6C depicts the following graph concepts, in query graph 600, which correspond to token 512 (mapped to the name attribute of ext. entity vertex 312) of query 500: a graph vertex 620 corresponding to ext. entity vertex 312 and associated with the alias "ext_entity_1"; a graph vertex 622 corresponding to the name attribute of ext. entity vertex 312, which is annotated with the name string of token 512; and a graph edge 624 that corresponds to the implied edge in data model 114 between the name attribute and ext. entity vertex 312. In addition to, or instead of, the annotation of vertex 622 to indicate the required string for the name attribute of ext. entity vertex 312, translator application 102 annotates edge 624 with "WHERE ext_entity_1.name="Bank_Name1"", which is pseudocode that indicates that the name attribute of an external entity, alias "ext_entity_1", should be the name string represented in token 512.

FIG. 6C further depicts a graph edge 626 in query graph 600 that corresponds to transfer_to edge 320, which is mapped to relationship token 510. According to the complete relationship mapping for token 510, the subject of the relationship is token 504 (represented by graph vertex 602) and the object of the relationship is token 512 (represented by graph vertex 620). However, in order to traverse the path in data model 114 from transaction vertex 314 to ext. entity vertex 312 by way of transfer_to edge 320, entity vertex 300 must be traversed by way of the inheritance ("is_a") relationship between ext. entity vertex 312 and entity vertex 300. Thus, query graph 600 includes a graph vertex 628 corresponding to entity vertex 300, and an inheritance graph edge 630 that represents the inheritance relationship between ext. entity vertex 312 and entity vertex 300. The subject of edge 626 (transfer_to) is graph vertex 602 (transaction), and the object of edge 626 (transfer_to) is graph vertex 620 (ext. entity) by way of graph vertex 628 (entity), as directed by the mapping data for query 500.

Figure 6D:
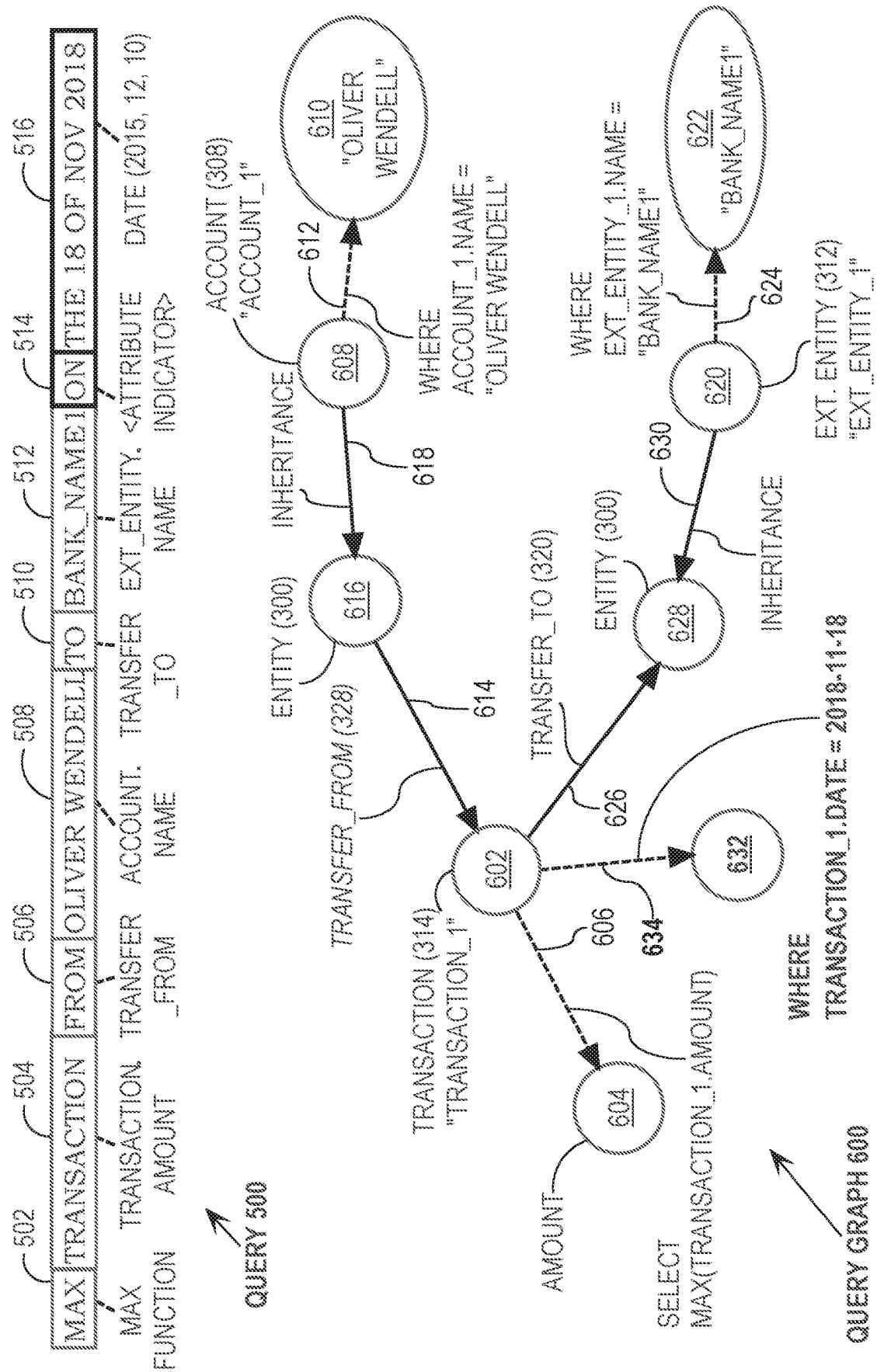

FIG. 6D depicts a graph vertex 632, in query graph 600, that corresponds to token 516 (mapped to a date query function) of query 500. According to the complete relationship mapping for token 514 (mapped to attribute indicator), the subject of the relationship is token 516 (represented by graph vertex 632) and the object of the relationship is token 504 (represented by graph vertex 602). Thus, FIG. 6D further depicts a graph edge 634 to represent token 514, where edge 634 corresponds to the implied edge in data model 114 between the date attribute and transaction vertex 314. Translator application 102 annotates edge 634 with the metadata "WHERE transaction_1.date=2018-11-18", which is pseudocode that indicates that the date attribute of a transaction, alias "transaction_1", should be the date represented in token 516.

Cycles

According to an embodiment, generation of a computer-executable query over the target data store for a given NL query is based on the query graph generated for the NL query. Representing an NL query with query-specific paths through data model 114, as shown in FIGS. 6A-6D above, allow for effective translation of an NL query, even if the NL query includes logical cycles. A logical cycle in a query appears when the same entity is used more than once, which results in a path (or a combination of paths), in the query graph representation of the query, that leads from the entity to itself. For example, the two named entities, "Bank_Name_1" and "Bank_Name_2" in query 104 both refer to institution vertex 306. Another example of an NL query that includes a logical cycle includes self-referential language, such as "find all transactions from Alberto to himself". In this case, only one alias is generated, as only one constraint on the account name is present (account.name="Alberto"), and the system would associate the existing alias to "himself" as no other valid option is possible (because no other constraint is specified, and no other valid path is possible).

An example of a logical cycle in a query is the presence of multiple tokens that are mapped to the same data model concept. In some query graphs, the multiple instances of the same concept are represented along two separate paths in the query graph. However, when the multiple instances of the same concept are found on the same path of the query graph, different aliases are used to distinguish among the different instances of the same concept. Such handling of logical cycles in a query preserves, within the translation of the query to computer-executable declarative language, cycle semantics that are present in the NL query.

To illustrate, query 104 includes two tokens, token 208 and token 212, that are both associated with institution vertex 306. These two tokens that map to the same vertex in data model 114 represent a logical cycle in that the same vertex type plays two different roles in the NL query, where one is the source of a transfer and one is the destination of the transfer.

FIG. 7 depicts a query graph 700 for query 104 that is constructed in a manner similar to query graph 600 described above. In query graph 700, token 208 is represented by query graph vertex 708, which corresponds to institution vertex 306, and is associated with the alias "institution_1". Token 212 is represented by a separate graph vertex 720, which also corresponds to institution vertex 306, and is associated with the distinct alias "institution_2". When query graph 700 is traversed to identify an intermediate query representation for NL query 104, the two instances of institution vertex 306 are represented distinctly in the translation because of the locations of the vertex instances along distinct paths, and also because of distinct aliases for the two tokens within the query graph.

Intermediate Query Representation

After computing the query graph for an NL query, it is possible to use the paths and annotations of the query graph to translate the input NL query to a semantically-equivalent query expressed in a declarative query language. Specifically, according to an embodiment, when data model 114 does not reflect the physical representation of data in data store 112, a query graph based on data model 114 is used to generate an intermediate representation of the NL query, which is a pseudocode-based representation of the query that represents the logical semantics of the NL query based on the concepts in the query graph. An intermediate query representation based on data model 114 that does not reflect the physical representation of data in data store 112 is semantically valid, but not in declarative format. However, if data model 114 reflects both the logical connections between data (as described above) and the physical representation of the data within data store 112, then the intermediate representation of the query described herein is also the final, computer-executable version of the query, and translator application 102 returns the intermediate query representation as a response to the request to translate the corresponding NL query. In the following illustrations, it is assumed that data model 114 does not reflect the physical representation of data in data store 112.

According to an embodiment, as part of translating an NL query into a computer-executable format, translator application 102 generates an intermediate representation of the query by traversing the query graph generated for the NL query. For example, translator application 102 traverses query graph 600 to produce an intermediate representation of query 500. To illustrate, traversal of query graph 600 produces the following Intermediate Representation 1 of query 500:

---
INTERMEDIATE REPRESENTATION 1:

SELECT MAX(oTransaction_1.amount)
FROM global_graph
MATCH
    (oTransaction_1:Transaction) <-[:transfer_from]-
    (oAccount_1:Entity) <-[:isa]- (oAccount_1:Account),
    (oTransaction_1:Transaction) -[:transfer_to]->
    (oExt_Entity_1:Entity) <-[:isa]- (oExt_Entity_1:Ext_Entity),
WHERE
    oAccount_1.name = 'Oliver Wendell' AND
    oExt_Entity_1.name = 'Bank_Name1' AND
    oTransaction_1.date = DATE '2018-11-18'

---

As another example, translator application 102 traverses query graph 700 to produce an intermediate representation of query 104. To illustrate, traversal of query graph 700 produces the following Intermediate Representation 2 of query 104:

---
INTERMEDIATE REPRESENTATION 2:

SELECT AVG(oTransaction_1.amount)
FROM global_graph
MATCH
    (oTransaction_1:Transaction) <-[:transfer_from]-
    (oInstitution_1:Entity) <-[:isa]-
    (oInstitution_1:Institution),
    (oTransaction_1:Transaction) -[:transfer_to]->
    (oInstitution_2:Entity) <-[:isa]-
    (oInstitution_2:Institution),
WHERE
    oInstitution_1.name = 'Bank_Name_1' AND
    oInstitution_2.name = 'Bank_Name_2' AND
    oTransaction_1.date = DATE '2015-12-10'

---

Generate a Computer-Executable Query

Figure 8:
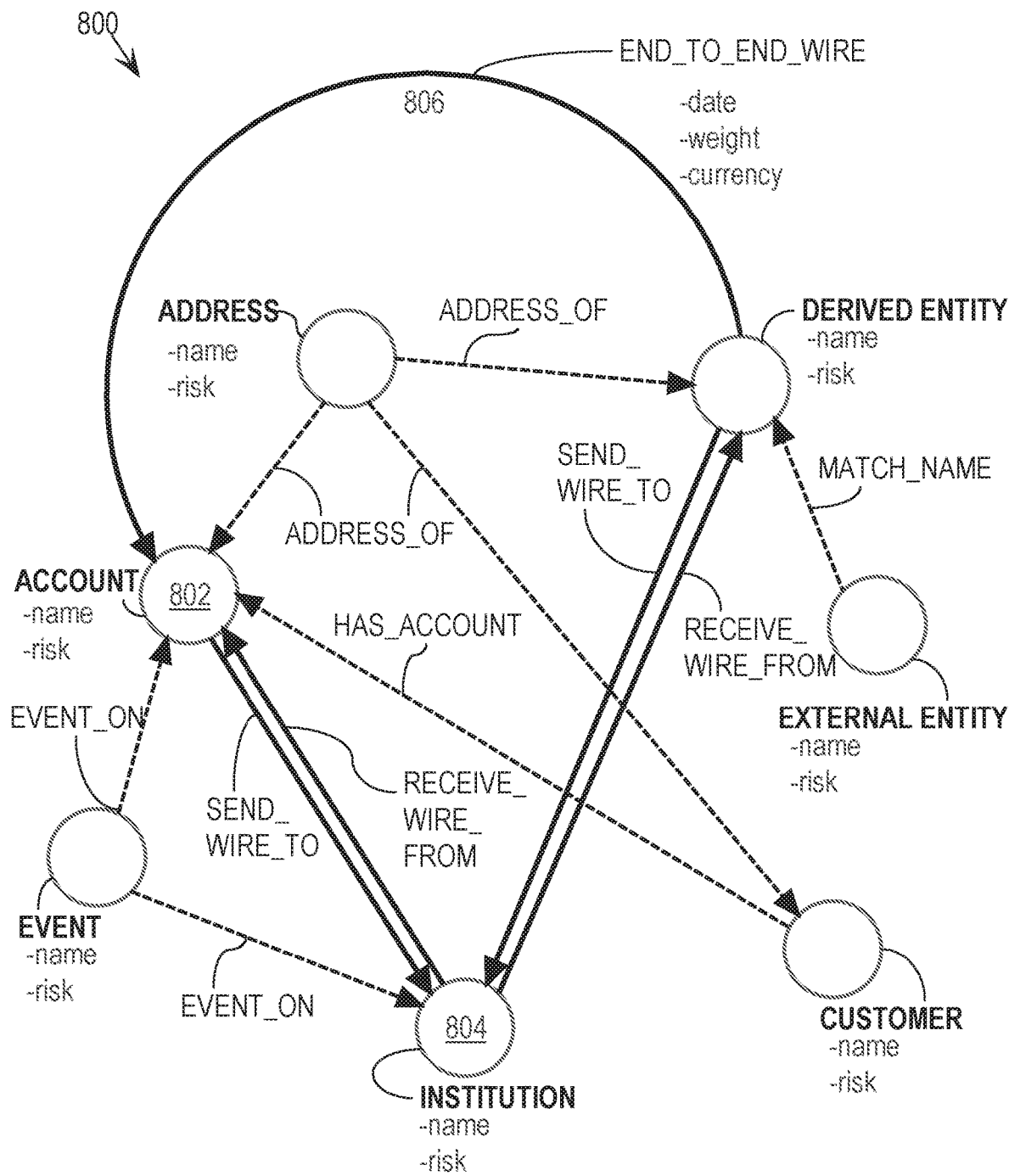
FIG. 8 depicts a physical schema that describes the physical representation of data in a data store.

As indicated, translator application 102 bases generation of a computer-executable query, from an NL query, on the intermediate representation of the NL query generated from the query graph of the query. According to an embodiment, a computer-executable query is a valid query in a declarative language, such as PGQL, SQL, SPARQL, etc. Translation data for a physical schema, such as schema 800 of FIG. 8, is used to translate an intermediate query representation of an NL query to a computer-executable version of the query. Example schema 800 describes the physical representation of graph data in data store 112, which is a particular implementation of the logical data structure indicated in data model 114. At this point, using translation data and an appropriate physical schema, the intermediate representation of the query could be translated to suit any kind of physical structure that implements the logical data structure indicated in data model 114, such as graph, relational, RDB, etc., using a declarative query language corresponding to the structure (such as PGQL, GraphQL, Cypher, etc. for graph data; SQL, MySQL, etc. for relational data; SPARQL, etc. for RDF).

More specifically, translation from an intermediate representation to a final declarative query uses translation data, which, according to an embodiment, comprises user-defined mappings between concepts of the logical schema and elements of the desired physical schema. For example, first translation data specifies that account vertex 308, which inherits from entity vertex 300, of data model 114 is mapped to account vertex 802 of physical schema 800. As a further example, second translation data specifies that account vertex 802 is mapped to a vertex, of a different physical schema, that represents a generic physical type "Entity", without additional information on a subtype in the physical schema.

Translating an intermediate representation of a query to a computer-executable version of the query based on translation data comprises replacing each logical query concept in the intermediate representation with the element of the physical schema that is mapped to the logical query concept in the translation data. According to an embodiment, if no mapping for a given logical query concept in an intermediate query representation is present, it is assumed that the physical representation of the concept is identical to the logical representation, and the reference to the logical concept is left unmodified in the final translation.

According to an embodiment, choosing the target declarative language (SQL, PGQL, etc.) is done by a user. The syntax and the grammar of the target declarative language are known to translator application 102, and the translation from the intermediate representation to the target declarative language is based on the known syntax and grammar. In most cases, mapping the intermediate language to the target language is straightforward (e.g., most WHERE clauses have the same structure), while in other cases a bit more work is required (e.g., a MATCH statement in an intermediate query representation can become a MATCH statement in PGQL, although with a slightly different syntax, or a JOIN in SQL.

To illustrate, translation data specifies which logical entities of data model 114 are mapped to physical vertices of physical schema 800 (e.g., Institution vertex 804) or to physical relations (e.g. end_to_end_wire 806), which in the computer-executable version of the query becomes a type constraint on the relation between oInstitution_1 and oInstitution_2. Also note that type constraints in the logical query (e.g. oInstitution_1:Institution) are mapped to WHERE filters: whether these type constraints should be mapped to subtypes or labels or properties on the physical schema is also specified in translation data, and reflects the physical representation of the data.

To illustrate generation of a computer-executable query in PGQL, based on translation data and schema 800, translator application 102 translates Intermediate Representation 2 of query 104, indicated above, to the following PGQL version of query 104:

```
SELECT AVG(oTransaction_1.weight)
FROM global_graph
MATCH
    (oInstitution_1) -[:oTransaction_1]-> (oInstitution_2)
WHERE
    oInstitution_1.name = 'Bank_Name_1' AND
    oInstitution_2.name = 'Bank_Name_2' AND
    oTransaction_1.date = DATE '2015-12-10' AND
    oInstitution_1.Label = 'Institution' AND
    oTransaction_1.Label IN ('end_to_end_wire', ...) AND
    oInstitution_2.Label = 'Institution'
```

To further illustrate generation of a computer-executable query in PGQL, based on schema 800, translator application 102 translates Intermediate Representation 1 of query 500, indicated above, to the following PGQL version of query 500:

```
SELECT MAX(oTransaction_1.WEIGHT)
FROM global_graph
MATCH
    (oAccount_1) -[ oTransaction_1:TRANSACTION]->
        (oExternalEntity_1)
WHERE
    oAccount_1.Name = 'Oliver Wendell' AND
    oExternalEntity_1.Name = 'Goldman Sachs' AND
    oTransaction_1.Date = '2018-11-18' AND
    label(oAccount_1) = 'Account' AND
    label(oExternalEntity_1) = 'External Entity'
```

Translator application 102 stores a generated computer-executable query in memory and, if indicated in the request to translate the NL query, returns the computer-executable query to the requesting entity (e.g., a client of the DBSM that includes database server instance 120). According to an embodiment, the request for translator application 102 to translate an NL query is a request to translate the query and run the translated query over data store 112. In this embodiment, translator application 102 causes database server instance 120 to run the computer-executable query over data store 112 and returns the query results to the requesting entity. To illustrate, database server instance 120 executes the computer-executable query, translated from query 104, over data store 112 and returns, to the requesting entity, the query result: AVG(oTransaction_1.Weight) 10954.545454545454.

Translator application 102 may have access to multiple physical schemas that reflect the physical structures of multiple different data stores storing data that conforms to data model 114. In this case, computer-executable queries over any of the multiple different data stores may be generated by translator application 102.

Database Overview

Embodiments of the present invention are used in the context of database management systems (DBMSs). Therefore, a description of an example DBMS is provided.

Generally, a server, such as a database server, or application is a combination of integrated software components and an allocation of computational resources, such as memory, a vertex, and processes on the vertex for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-vertex database management system is made up of interconnected vertices that share access to the same database. Typically, the vertices are interconnected via a network and share access, in varying degrees, to shared storage, e.g. shared access to a set of disk drives and data blocks stored thereon. The vertices in a multi-vertex database system may be in the form of a group of computers (e.g., workstations, personal computers) that are interconnected via a network. Alternately, the vertices may be the vertices of a grid, which is composed of vertices in the form of server blades interconnected with other server blades on a rack.

Each vertex in a multi-vertex database system hosts a database server. A server, such as a database server, is a combination of integrated software components and an allocation of computational resources, such as memory, a vertex, and processes on the vertex for executing the integrated software components on a processor, the combination of the software and computational resources being dedicated to performing a particular function on behalf of one or more clients.

Resources from multiple vertices in a multi-vertex database system can be allocated to running a particular database server's software. Each combination of the software and allocation of resources from a vertex is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary for data store 112 may comprise multiple data structures that store database metadata, which is a representation of the physical schema of a data store. A database dictionary may, for example, comprise multiple files and tables. Portions of the data structures may be cached in main memory of a database server. When a database object is said to be defined by a database dictionary, the database dictionary contains metadata that defines properties of the database object (which are the physical properties of the database object). For example, metadata in a database dictionary defining a database table may specify the column names and datatypes of the columns, and one or more files or portions thereof that store data for the table. Metadata, reflecting the physical schema of data store 112, stored in the database dictionary, may define a procedure, which may be the physical counterpart to a logical relationship represented in data model 114. The physical metadata for the procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other physical schema properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer to determine which execution plan should be used to compute the query.

Execution plans may be represented by a graph of interlinked vertices, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

A database client, not depicted in FIG. 1, connects to a database system that comprises database server instance 120. The client may comprise a database application running on a client vertex. The client interacts with database server instance 120 by submitting commands that cause the instance to perform operations on data stored in the database. For example, a command may be a request to access or modify data from the database, perform operations on the data, and/or return the data to the client.

According to an embodiment, device 100 may be a single device implementing the database system, or may be part of a cluster of machines, known as vertices, each running a database server instance. A database server instance (or "instance") is a server that comprises a combination of the software and allocation of resources from a machine vertex. Specifically, a server, such as a database server, or any other process is a combination of integrated software components and an allocation of computational resources, such as memory, a vertex (i.e., a computing device and/or memory accessible to the computing device), and/or sub-processes on the vertex for executing the integrated software components on a processor, the combination of the software and computational resources being dedicated to performing a particular function on behalf of one or more clients. When the database system is a multi-vertex system, instances of the database system, such as database server instance 120, collectively implement server-side functions of the distributed database system.

Data store 112 stores database data in any format, such as graph, RDF, relational, etc. Data store 112 may reside in volatile and/or non-volatile storage, including persistent storage 110 or volatile memory of computing device 100. Each vertex implementing a multi-vertex database system may include a virtual disk and/or a set of physical disks.

Additionally or alternatively, data store 112 may be stored, at least in part, in main memory of a database server computing device.

Database data for data store 112 may be stored in any type of computer-readable storage media, such as flash storage or non-volatile memory. In some embodiments, data store 112 stores data for a distributed database that comprises a plurality of databases each stored in a respective one or more storage media. In other embodiments, machines implementing the database system have shared access to at least a portion of database data via shared access to storage storing database data.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
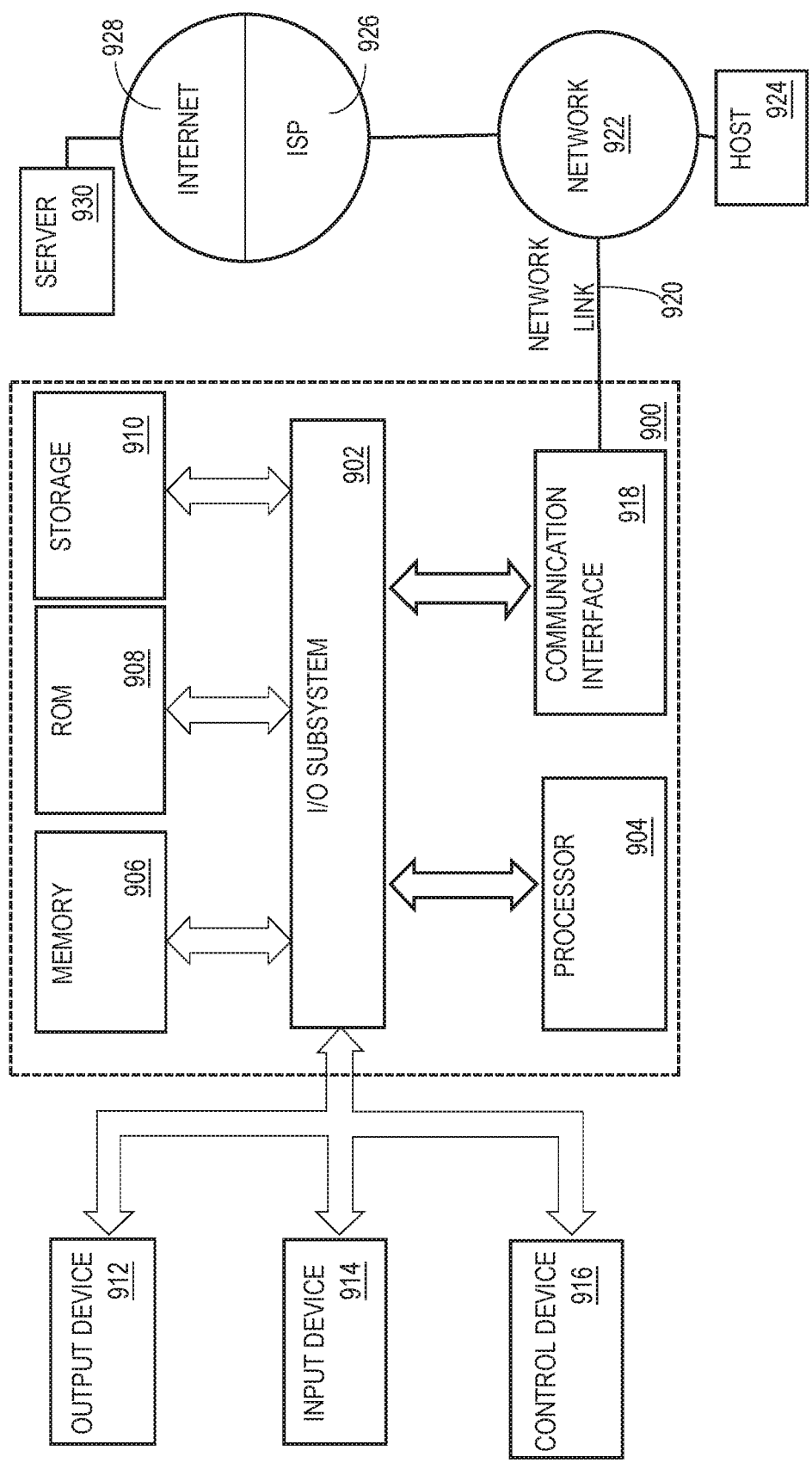
FIG. 9 is a block diagram that illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
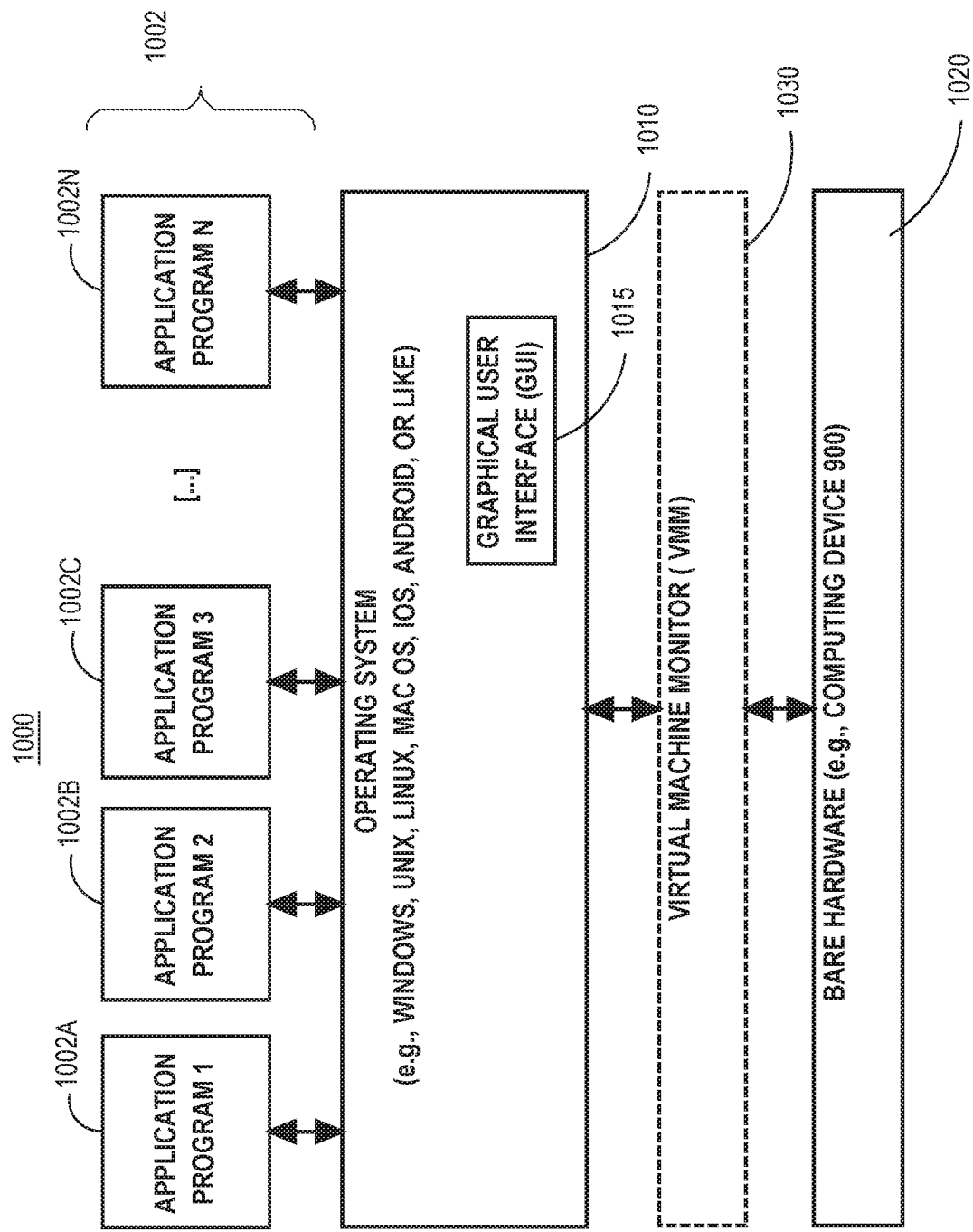
FIG. 10 is a block diagram of a basic software system that may be employed for controlling the operation of a computer system.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   automatically parsing a particular natural language (NL) query, over one or more database objects, into a plurality of NL tokens;
   generating a syntactic dependency tree for the particular NL query based on the plurality of NL tokens;

based, at least in part, on the syntactic dependency tree, generating mapping data that maps each NL token, of the plurality of NL tokens, to one or more data model concepts of a logical data model associated with the one or more database objects, wherein:
  the mapping data maps one or more first tokens, of the plurality of NL tokens, to one or more particular entity-type concepts represented by one or more nodes in the logical data model,
  the mapping data maps one or more second tokens, of the plurality of NL tokens, to one or more particular relationship-type concepts of a plurality of relationship-type concepts in the logical data model, and
  the plurality of relationship-type concepts is represented by (a) a plurality of edges between nodes of a plurality of nodes in the logical data model, and (b) a plurality of implied edges that represent relationships between nodes and node attributes;
generating, based on the mapping data and the logical data model, a graph that represents the particular NL query;
wherein the graph that represents the particular NL query comprises data model concepts and an inheritance edge;
generating a computer-executable query over the one or more database objects based, at least in part, on the graph that represents the particular NL query and the inheritance edge; and
causing the computer-executable query to be executed over the one or more database objects;
wherein the method is performed by one or more computing devices.

2. The computer-executed method of claim 1, wherein said generating the graph that represents the particular NL query based, at least in part, on the mapping data and the logical data model comprises including, in the graph that represents the particular NL query:
  one or more nodes that correspond to the one or more particular entity-type concepts mapped to the one or more first tokens in the mapping data; and
  one or more edges that correspond to the one or more particular relationship-type concepts mapped to the one or more second tokens in the mapping data.

3. The computer-executed method of claim 1, wherein:
two or more tokens, of the plurality of NL tokens of the particular NL query, are mapped to a particular concept of the logical data model;
the graph that represents the particular NL query includes two or more component concepts that respectively represent the two or more tokens;
the logical data model represents a plurality of paths through the logical data model; and
the two or more component concepts are located on different paths of the plurality of paths.

4. The computer-executed method of claim 1, wherein:
two or more tokens, of the plurality of NL tokens of the particular NL query, are mapped to a particular concept of the logical data model;
the graph that represents the particular NL query includes two or more component concepts that respectively represent the two or more tokens;
each component concept, of the two or more component concepts, is associated with a component-specific alias;
the component-specific aliases associated with the two or more component concepts are different;
said generating the computer-executable query over the one or more database objects based, at least in part, on the graph that represents the particular NL query comprises representing, in the computer-executable query, the two or more component concepts of the graph that represents the particular NL query using the component-specific aliases.

5. The computer-executed method of claim 1, further comprising:
generating an intermediate query representation by traversing the graph that represents the particular NL query;
wherein said generating the computer-executable query over the one or more database objects based, at least in part, on the graph that represents the particular NL query comprises translating the intermediate query representation to the computer-executable query based, at least in part, on a physical schema that reflects a physical structure of data stored in the one or more database objects.

6. The computer-executed method of claim 1, further comprising:
running the computer-executable query over the one or more database objects to produce query results; and
returning the query results to a user associated with the particular NL query.

7. A computer-executed method comprising:
generating mapping data that maps each natural language (NL) token, of a plurality of NL tokens of a particular NL query over one or more database objects, to one or more data model concepts of a data model associated with the one or more database objects;
wherein the data model comprises:
  entity-type concepts that are represented by a plurality of nodes in the data model, and
  relationship-type concepts that are represented by (a) a plurality of edges between nodes of the plurality of nodes, and (b) a plurality of implied edges that represent relationships between nodes and node attributes;
wherein the mapping data comprises a plurality of candidate relationship mappings, each of which maps a particular NL relationship token, of the plurality of NL tokens, to a candidate relationship-type concept of the data model;
identifying a final relationship mapping, of the plurality of candidate relationship mappings, for the particular NL relationship token comprising:
  for each candidate relationship mapping, of the plurality of candidate relationship mappings, generating a cost metric based, at least in part, on (a) the data model, (b) at least one implied edge of the plurality of implied edges that represent relationships between nodes and node attributes, and (c) the mapping data to produce a plurality of cost metrics, and
  based on the plurality of cost metrics, identifying the final relationship mapping, for the particular NL relationship token, from the plurality of candidate relationship mappings;
after identifying the final relationship mapping, generating a computer-executable query over the one or more database objects based, at least in part, on the mapping data; and
causing the computer-executable query to be executed over the one or more database objects;
wherein the method is performed by one or more computing devices.

8. The computer-executed method of claim 7, wherein each candidate relationship mapping of the plurality of candidate relationship mappings comprises a unique combination of: (a) a relationship-type concept, (b) an object token, (c) an object token type, (d) a subject token, and (e) a subject token type.

9. The computer-executed method of claim 7, wherein generating a particular cost metric for a particular candidate relationship mapping, of the plurality of candidate relationship mappings, comprises determining a number of hops, in the data model, between one or more source concepts and one or more destination concepts indicated in the mapping data for the particular candidate relationship mapping.

10. The computer-executed method of claim 7, wherein said generating the mapping data that maps each NL token, of the plurality of NL tokens, to the one or more data model concepts is based on one or more of:
    direct matching;
    indirect matching;
    rules-based matching; and
    fuzzy matching.

11. The computer-executed method of claim 7, wherein said generating the mapping data that maps each NL token, of the plurality of NL tokens, to the one or more data model concepts is based, at least in part, on rules-based matching by using one or more matching rules that associate one or more terms in the particular NL query to one or more concepts in the data model.

12. The computer-executed method of claim 7, wherein said generating the mapping data that maps each NL token, of the plurality of NL tokens, to the one or more data model concepts is based, at least in part, on a syntactic dependency tree for the particular NL query.

13. One or more non-transitory computer-readable media storing one or more sequences of instructions that, when executed by one or more processors, cause:
    automatically parsing a particular natural language (NL) query, over one or more database objects, into a plurality of NL tokens;
    generating a syntactic dependency tree for the particular NL query based on the plurality of NL tokens;
    based, at least in part, on the syntactic dependency tree, generating mapping data that maps each NL token, of the plurality of NL tokens, to one or more data model concepts of a logical data model associated with the one or more database objects, wherein:
        the mapping data maps one or more first tokens, of the plurality of NL tokens, to one or more particular entity-type concepts represented by one or more nodes in the logical data model,
        the mapping data maps one or more second tokens, of the plurality of NL tokens, to one or more particular relationship-type concepts of a plurality of relationship-type concepts in the logical data model, and
        the plurality of relationship-type concepts is represented by (a) a plurality of edges between nodes of a plurality of nodes in the logical data model, and (b) a plurality of implied edges that represent relationships between nodes and node attributes;
    generating, based on the mapping data and the logical data model, a graph that represents the particular NL query;
    wherein the graph that represents the particular NL query comprises data model concepts and an inheritance edge;
    generating a computer-executable query over the one or more database objects based, at least in part, on the graph that represents the particular NL query and the inheritance edge; and
    causing the computer-executable query to be executed over the one or more database objects.

14. The one or more non-transitory computer-readable media of claim 13, wherein said generating the graph that represents the particular NL query based, at least in part, on the mapping data and the logical data model comprises including, in the graph that represents the particular NL query:
    one or more nodes that correspond to the one or more particular entity-type concepts mapped to the one or more first tokens in the mapping data; and
    one or more edges that correspond to the one or more particular relationship-type concepts mapped to the one or more second tokens in the mapping data.

15. The one or more non-transitory computer-readable media of claim 13, wherein:
    two or more tokens, of the plurality of NL tokens of the particular NL query, are mapped to a particular concept of the logical data model;
    the graph that represents the particular NL query includes two or more component concepts that respectively represent the two or more tokens;
    the logical data model represents a plurality of paths through the logical data model; and
    the two or more component concepts are located on different paths of the plurality of paths.

16. The one or more non-transitory computer-readable media of claim 13, wherein:
    two or more tokens, of the plurality of NL tokens of the particular NL query, are mapped to a particular concept of the logical data model;
    the graph that represents the particular NL query includes two or more component concepts that respectively represent the two or more tokens;
    each component concept, of the two or more component concepts, is associated with a component-specific alias;
    the component-specific aliases associated with the two or more component concepts are different;
    said generating the computer-executable query over the one or more database objects based, at least in part, on the graph that represents the particular NL query comprises representing, in the computer-executable query, the two or more component concepts of the graph that represents the particular NL query using the component-specific aliases.

17. The one or more non-transitory computer-readable media of claim 13, wherein the one or more sequences of instructions further comprise instructions that, when executed by one or more processors, cause:
    generating an intermediate query representation by traversing the graph that represents the particular NL query;
    wherein said generating the computer-executable query over the one or more database objects based, at least in part, on the graph that represents the particular NL query comprises translating the intermediate query representation to the computer-executable query based, at least in part, on a physical schema that reflects a physical structure of data stored in the one or more database objects.

18. The one or more non-transitory computer-readable media of claim 13, wherein the one or more sequences of instructions further comprise instructions that, when executed by one or more processors, cause:
    running the computer-executable query over the one or more database objects to produce query results; and
    returning the query results to a user associated with the particular NL query.

19. One or more non-transitory computer-readable media storing one or more sequences of instructions that, when executed by one or more processors, cause:
  generating mapping data that maps each natural language (NL) token, of a plurality of NL tokens of a particular NL query over one or more database objects, to one or more data model concepts of a data model associated with the one or more database objects;
  wherein the data model comprises:
    entity-type concepts that are represented by a plurality of nodes in the data model, and
    relationship-type concepts that are represented by (a) a plurality of edges between nodes of the plurality of nodes, and (b) a plurality of implied edges that represent relationships between nodes and node attributes;
  wherein the mapping data comprises a plurality of candidate relationship mappings, each of which maps a particular NL relationship token, of the plurality of NL tokens, to a candidate relationship-type concept of the data model;
  identifying a final relationship mapping, of the plurality of candidate relationship mappings, for the particular NL relationship token comprising:
    for each candidate relationship mapping, of the plurality of candidate relationship mappings, generating a cost metric based, at least in part, on (a) the data model, (b) at least one implied edge of the plurality of implied edges that represent relationships between nodes and node attributes, and (c) the mapping data to produce a plurality of cost metrics, and
    based on the plurality of cost metrics, identifying the final relationship mapping, for the particular NL relationship token, from the plurality of candidate relationship mappings;
  after identifying the final relationship mapping, generating a computer-executable query over the one or more database objects based, at least in part, on the mapping data; and
  causing the computer-executable query to be executed over the one or more database objects.

20. The one or more non-transitory computer-readable media of claim 19, wherein each candidate relationship mapping of the plurality of candidate relationship mappings comprises a unique combination of: (a) a relationship-type concept, (b) an object token, (c) an object token type, (d) a subject token, and (e) a subject token type.

21. The one or more non-transitory computer-readable media of claim 19, wherein generating a particular cost metric for a particular candidate relationship mapping, of the plurality of candidate relationship mappings, comprises determining a number of hops, in the data model, between one or more source concepts and one or more destination concepts indicated in the mapping data for the particular candidate relationship mapping.

22. The one or more non-transitory computer-readable media of claim 19, wherein said generating the mapping data that maps each NL token, of the plurality of NL tokens, to the one or more data model concepts is based on one or more of:
  direct matching;
  indirect matching;
  rules-based matching; and
  fuzzy matching.

23. The one or more non-transitory computer-readable media of claim 19, wherein said generating the mapping data that maps each NL token, of the plurality of NL tokens, to the one or more data model concepts is based, at least in part, on rules-based matching by using one or more matching rules that associate one or more terms in the particular NL query to one or more concepts in the data model.

24. The one or more non-transitory computer-readable media of claim 19, wherein said generating the mapping data that maps each NL token, of the plurality of NL tokens, to the one or more data model concepts is based, at least in part, on a syntactic dependency tree for the particular NL query.

* * * * *

UNITED STATES PATENT AND TRADEMARK OFFICE
CERTIFICATE OF CORRECTION

PATENT NO. : 11,816,102 B2
APPLICATION NO. : 16/991888
DATED : November 14, 2023
INVENTOR(S) : Parravicini et al.

It is certified that error appears in the above-identified patent and that said Letters Patent is hereby corrected as shown below:

On the Title Page

Column 2, under Abstract, Line 17, after "used" insert -- to --, therefor.

In the Drawings

On sheet 11 of 14, in FIG. 7, under Reference Numeral 724, Line 2, delete "INSTUTITION" and insert -- INSTITUTION --, therefor.

In the Specification

In Column 11, Line 32, delete ""average"" and insert -- "avrage" --, therefor.

In Column 16, Line 45, delete ""hold_account"" and insert -- "hold account" --, therefor.

In Column 23, Line 45, delete "SQL." and insert -- SQL). --, therefor.

In Column 25, Line 25, delete "WL" and insert -- XML --, therefor.

Signed and Sealed this
Eleventh Day of June, 2024

Katherine Kelly Vidal
*Director of the United States Patent and Trademark Office*